United States Patent
Kelaiditis et al.

(10) Patent No.: US 8,192,140 B2
(45) Date of Patent: Jun. 5, 2012

(54) APPARATUS FOR USE OF FLOW ENERGY

(76) Inventors: Konstantin Kelaiditis, St. Ingbert (DE);
Nikolas Kelaiditis, St. Ingbert (DE);
Alexis Kelaiditis, St. Ingbert (DE)

( * ) Notice: Subject to any disclaimer, the term of this patent is extended or adjusted under 35 U.S.C. 154(b) by 793 days.

(21) Appl. No.: 12/226,166

(22) PCT Filed: Apr. 11, 2007

(86) PCT No.: PCT/DE2007/000652
§ 371 (c)(1),
(2), (4) Date: Dec. 15, 2008

(87) PCT Pub. No.: WO2007/118462
PCT Pub. Date: Oct. 25, 2007

(65) Prior Publication Data
US 2009/0169354 A1    Jul. 2, 2009

(30) Foreign Application Priority Data

Apr. 13, 2006 (DE) .......................... 10 2006 017 963
Dec. 5, 2006 (DE) .......................... 10 2006 057 677

(51) Int. Cl.
*B63H 1/17* (2006.01)
*F01D 1/24* (2006.01)
*F03D 9/00* (2006.01)

(52) U.S. Cl. .............................. 415/62; 416/189; 290/55

(58) Field of Classification Search ................... 415/4.2, 415/60, 62; 416/167, 117, 111, 178, 187, 416/179, 189; 290/55, 44, 1 B
See application file for complete search history.

(56) References Cited

U.S. PATENT DOCUMENTS

| | | | |
|---|---|---|---|
| 1,148,989 A * | 8/1915 | Reese | 416/117 |
| 4,047,834 A | 9/1977 | Magoveny et al. | |
| 4,350,900 A * | 9/1982 | Baughman | 290/55 |
| 5,332,354 A | 7/1994 | Lamont | |
| 6,666,650 B1 * | 12/2003 | Themel | 416/200 R |
| 2004/0174019 A1 * | 9/2004 | Diederich | 290/54 |
| 2007/0098563 A1 * | 5/2007 | Rowan et al. | 416/244 R |

FOREIGN PATENT DOCUMENTS

| | | |
|---|---|---|
| AT | 2835 084 | 11/1984 |
| DE | 42 32 757 | 3/1994 |
| FR | 554 160 | 6/1923 |
| GB | 2 131 491 | 6/1984 |
| WO | 01/27470 | 4/2001 |
| WO | 2005/047694 | 5/2005 |

* cited by examiner

*Primary Examiner* — Thomas L Dickey
*Assistant Examiner* — Nikolay Yushin
(74) *Attorney, Agent, or Firm* — Lucas & Mercanti, LLP; Klaus P. Stoffel

(57) ABSTRACT

The apparatus for use of flow energy has elongated circumferential elements (18) with incident-flow surfaces (34, 35) facing the flow, which elements (8) are connected parallel to one another at intervals to form a rotating cage (1) or to form a strip, which is circumferential on a guide and in which they form crossbars, and the rotation axis or deflection axes is or are arranged transversely to the flow direction, with the elements (8) each having two incident-flow surfaces (34, 35). The two incident-flow surfaces (34, 35) may have the capability to swivel into the direction facing the wind by rotation of the elements (8) when the rotor (1) or strip is running. Outside the rotating cage (1), the apparatus may be provided with essentially radially aligned guide walls (22), and the rotor (1) and the walls (22) may be provided with a roof (24) in the form of a flat truncated cone.

18 Claims, 29 Drawing Sheets

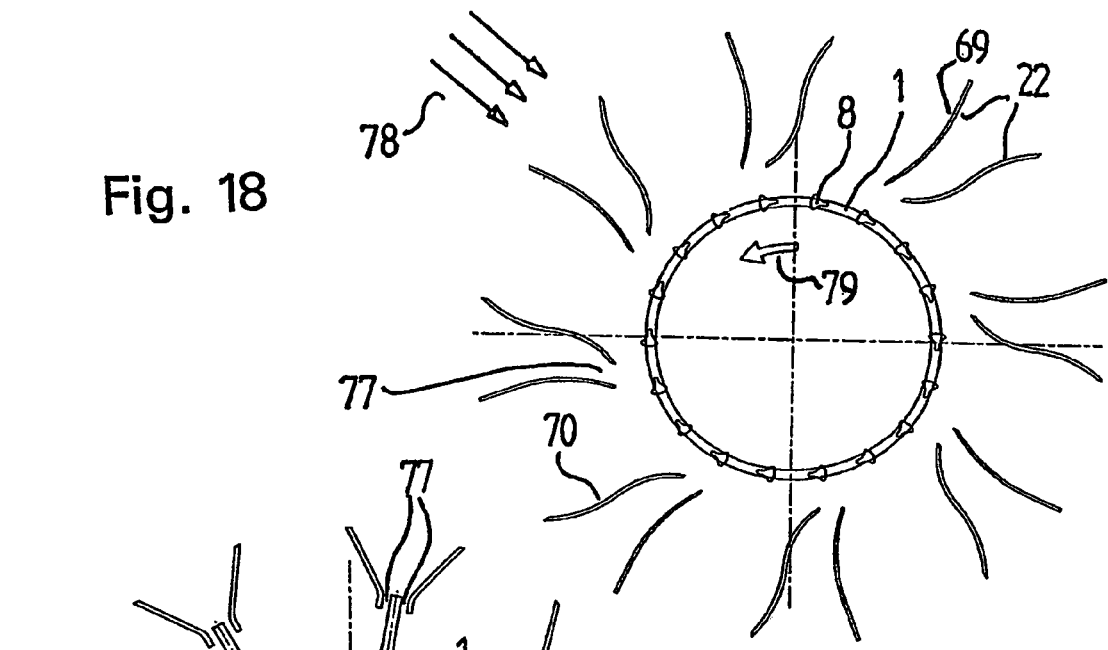
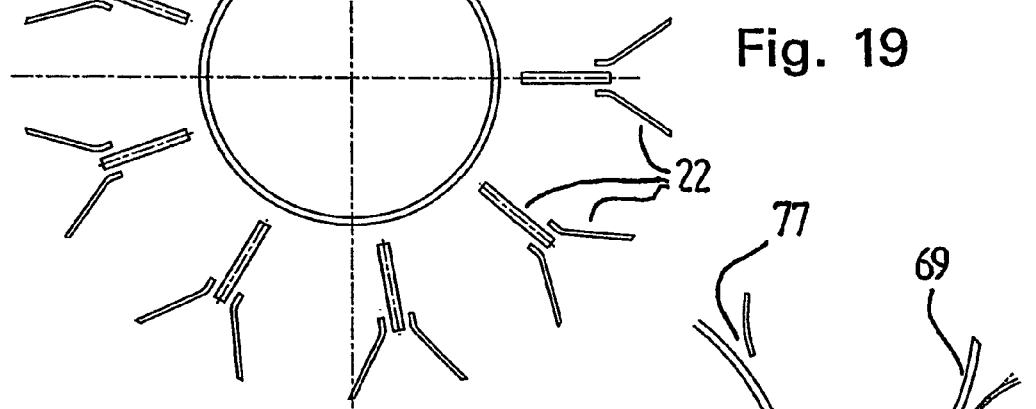
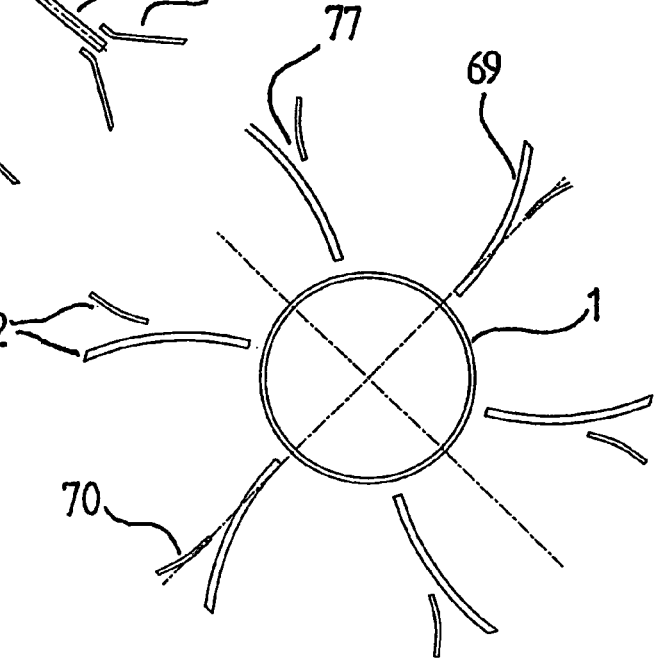

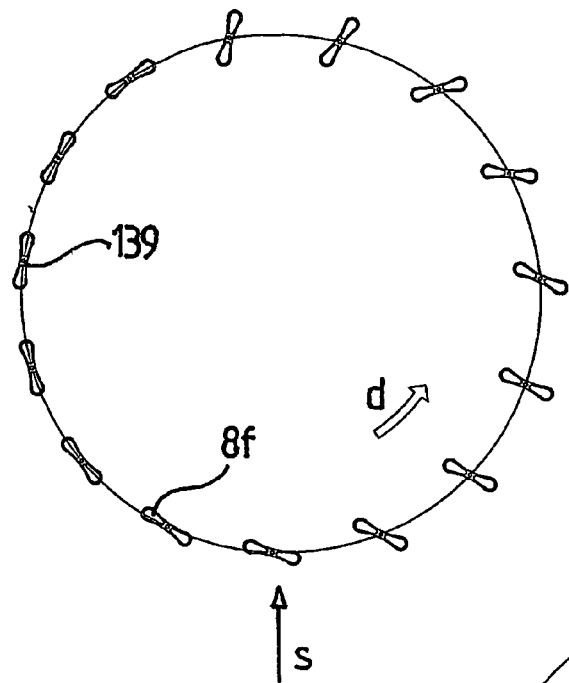
Fig. 45
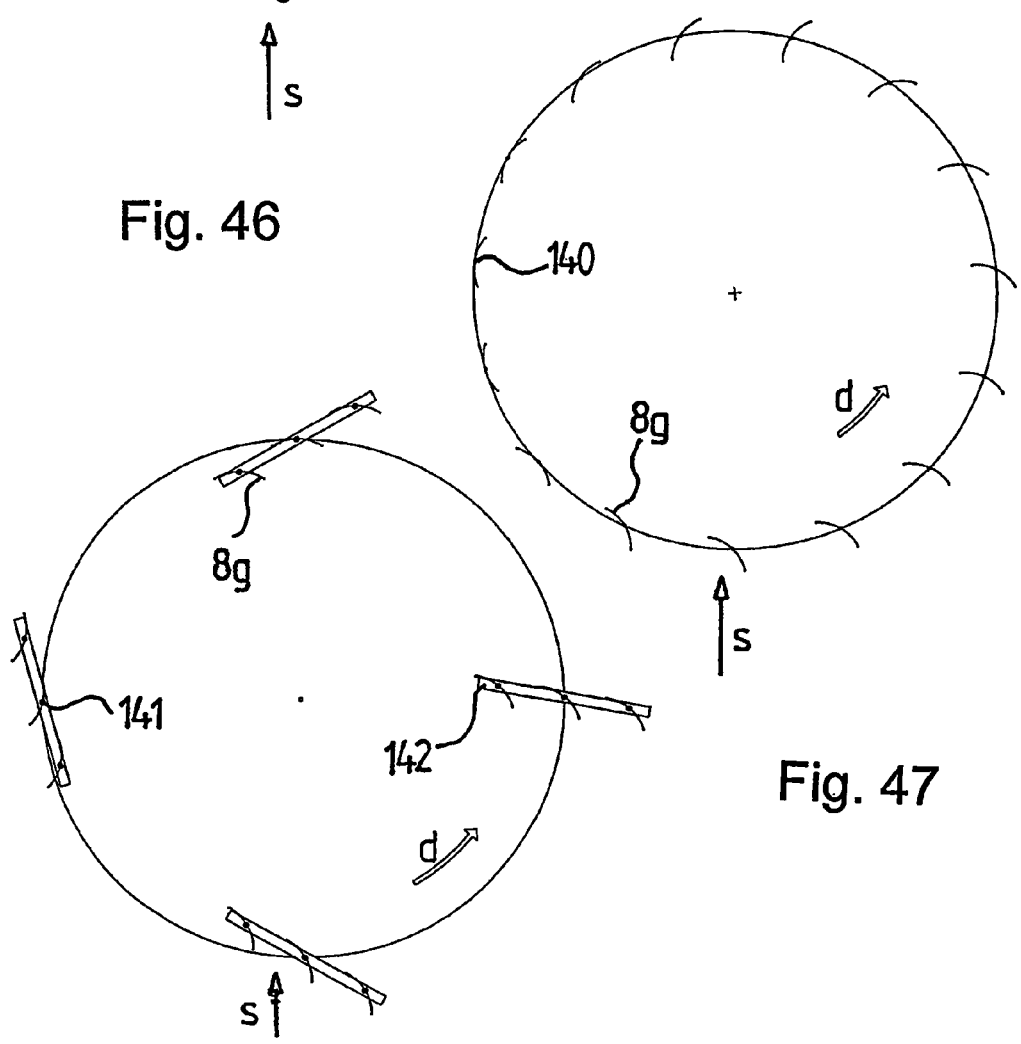
Fig. 46
Fig. 47

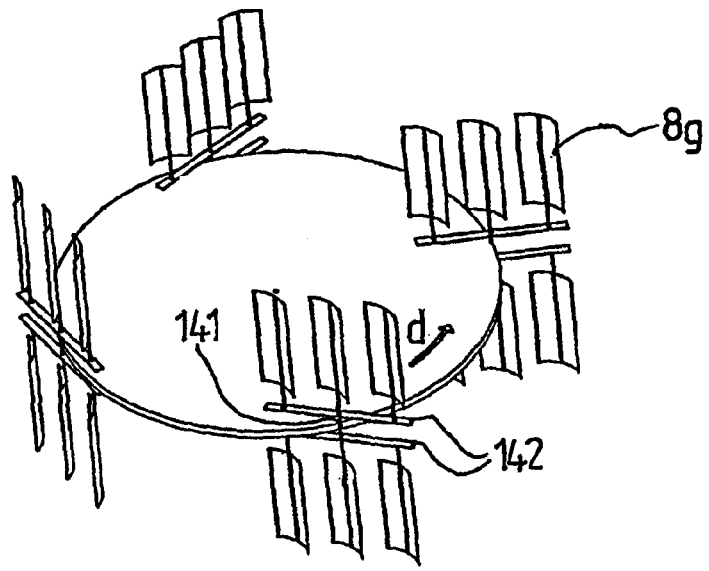
Fig. 48
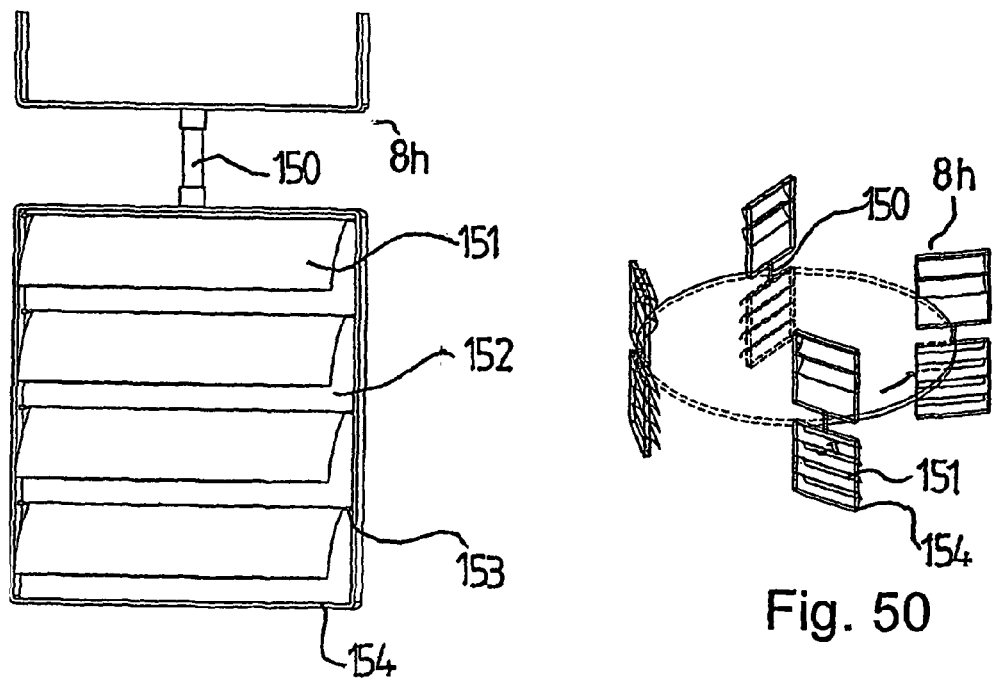
Fig. 49
Fig. 50

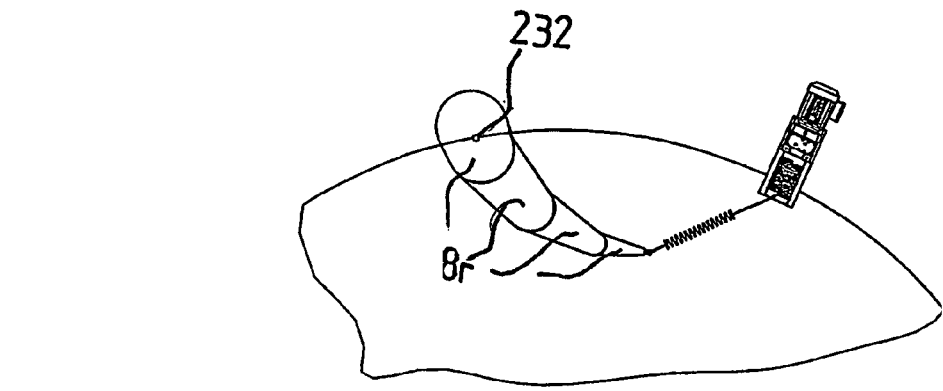
Fig. 67
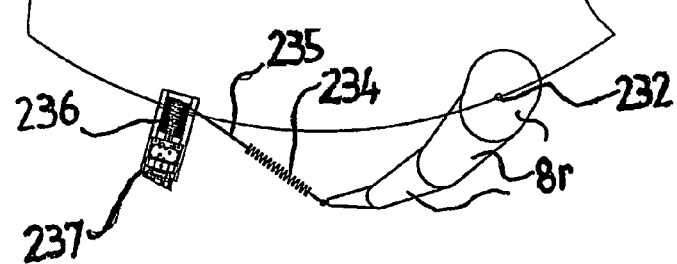
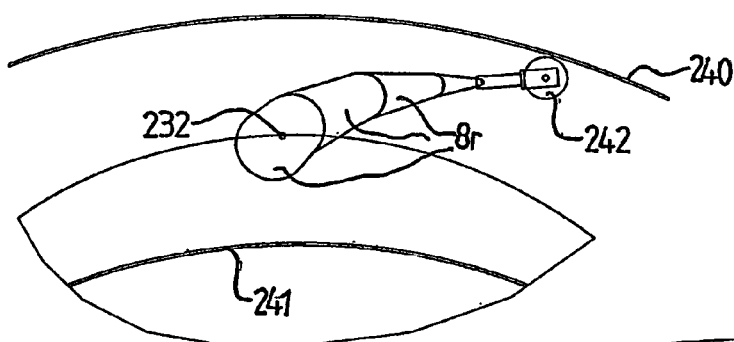
Fig. 68
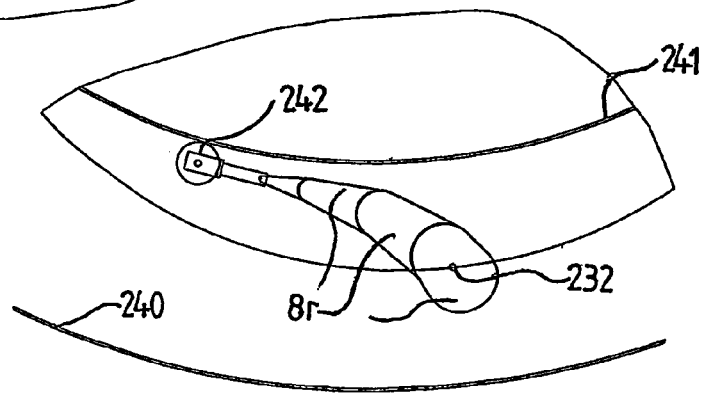

APPARATUS FOR USE OF FLOW ENERGY

The invention pertains to an apparatus for the use of flow energy, especially wind energy, with elongated elements, which travel around a closed path and comprise incident-flow surfaces. Apparatuses of this type in the form of wind turbines are known. The invention is based on the task of creating another type of apparatus of the general category indicated above. According to the invention, the elements are arranged parallel to each other and a certain distance apart to form a rotating cage or an endless belt, which travels along a guide and on which the elements form rungs, the axis of rotation or the deflection axes being transverse to the flow direction.

The inventive apparatus differs from known wind turbines chiefly with respect to the direction in which the elements move. In contrast to a wind turbine, these elements move and rotate parallel to themselves, usually horizontally, not in a plane perpendicular to the flow direction. The rotational movement in the invention is executed instead by the cage or by the belt on which the elements are mounted. An apparatus of this type makes possible a compact design, which can be installed inside a tower, for example, so that the same amount of power can be produced in less space than that required for known wind turbines. Thus the costs of installation and maintenance are reduced, and the environment is not burdened by visible movement and shifting shadows.

According to an especially advantageous elaboration of the invention, each of the elements has two incident-flow surfaces, one of which, as the element travels, faces the flow when the element is on the upstream side of the rotor or belt, whereas the other surface faces the flow when the element is on the downstream side.

For design reasons, one side of the apparatus is always facing the flow, and the other side is downstream of the elements on the upstream side. It is advisable to provide a plurality of elements on the rotating cage or endless traveling belt. Because of the large number of elements and their large flow-capturing area, flow energy can be captured by a large percentage of the area of the rotor or belt exposed to the flow.

Because the individual elements are mounted a certain distance apart from each other on the cage or belt, some of the flow always passes through the upstream side. This part of the flow is captured by the downstream elements and contributes to the energy transfer.

So that the energy can be captured by an appropriately angled orientation of the incident-flow surface on the downstream side, the elements can have a generally triangular, preferably symmetric, form, the two incident-flow surfaces forming two sides of a triangle.

If a triangle with a suitable angle is chosen, a design is obtained which leads to the desired slanted orientation of the incident-flow surfaces with respect to the flow on the two previously mentioned sides. If the elements are of symmetric design, the axis of symmetry of the elements can be parallel to the direction in which the cage or belt moves.

In an elaboration of the invention, the elements comprise pivoting or elastic panels, which serve to increase the size of the incident-flow surfaces, and which are arranged at the edge between the two incident-flow surfaces of the element in such a way that they are oriented essentially parallel to the side of the triangle upon which the flow acts. This measure makes it possible for the elements to be adapted to the flow direction. Because panels are now used instead of the triangular profile forms, the amount of material used is less than that required for the other design. In the case of the elastic variant, the panels are bent by the flow, and thus the area upon which the flow acts is reduced. In this way, the force of the flow acting on the elements is self-regulating.

In another embodiment of the invention, the elements have an aerodynamic cross section in order that advantage can be taken of the lift generated by this shape on the upstream side of the cage, on the downstream side of the cage, or on both sides of the cage.

In a further embodiment, the elements themselves should be supported with freedom to pivot and are held in place by springs so that they give way when the flow reaches a certain intensity. This has the result of reducing the load on the elements of the apparatus. It is also possible in this way, however, for a relatively large part of the flow to be guided to the rear elements, where use can therefore still be made of it.

In another embodiment, the elements comprise through-openings, which are preferably elongated and parallel to each other. Stationary or movable shutters, which at least partially close off the through-openings, can be provided in the openings. It advantageous that in this way the rotor blades can be made wider, and thus fewer elements are required around the circumference of the rotor. For this reason, the transport units required are also smaller. Production and on-site installation are therefore also simpler. The opening angle of the shutters can be controllable. This makes it easier to control the power takeoff. Some of the flowing medium is guided in a more-or-less parallel fashion. Thus less turbulence is created, and the energy yield from the departing flow medium is increased.

In another embodiment of the invention, elements of several different designs as described for the preceding embodiments are mounted on the rotor. By combining elements of several different types, the flow energy can be captured in several different ways, which means that the apparatus can be adapted more easily to the actual flow conditions.

It is advisable for the elements to be tilted with respect to the axis of rotation.

The flow will therefore also impose not only a horizontal force component on the elements but also a vertical force component. As a result, depending on the direction of the tilt, the stability of the rotor can be increased or the load on the bearings reduced.

In another embodiment, the elements themselves should be free to pivot, so that a mechanism on the upstream side and another on the downstream side can orient them to the flow as desired. The pivot angle corresponds to the angle of the triangle formed by the two incident-flow surfaces in the previously described embodiment. Elements with an aerodynamic form will be pivoted to an angle at which lift is generated. A combination of the two measures is also possible. The pivoting can also be accomplished in whole or in part by the flow itself. As an alternative with a similar pivoting action, elements can also be provided which have only one incident-flow surface. In this case, they will be rotated so that they face the flow.

In an elaboration of the invention, the apparatus comprises a control unit, preferably programmable, for the automatic orientation of the elements as a function of the direction and/or intensity of the flow and/or the rotational velocity of the rotor, where each element, upon rotation of the rotor, is oriented individually in such a way that, regardless of its position on the rotor, the force acting on the element makes the greatest possible contribution to the rotation of the rotor. The efficiency of the apparatus can thus be increased even more.

The elements can be oriented during operation in such a way, furthermore, that the rotational velocity can be controlled or even in such a way that the rotor is braked to prevent, for example, an overload on the apparatus in the presence of a very powerful flow. If the rotor is to be held at a standstill, the elements will be oriented so that the flow exerts the least possible rotation-inducing force on the rotor or possibly even none at all.

In another embodiment of the invention, the cage is supported by wheels and guided on guides, along which the wheels roll. The guides can be formed by rails, but simple roll-over surfaces can also be imagined. The cage is supported both vertically and horizontally on the base which supports the apparatus. The vertical support system carries the weight of the cage. The horizontal support system stabilizes the cage against the forces acting in the horizontal direction, namely, the forces which the wind exerts on the cage. Correspondingly, only a horizontal support system is provided on the top of the cage. The wheels can be mounted on the rotor, and the guide can be mounted on the base. Alternatively, the wheels could be mounted on the base and thus form the support system. The rotor would then have rails or guide surfaces on the bottom, on which the wheels would roll. Correspondingly, the rotor and the base can have both wheels and guide surfaces.

Alternatively, a single vertical and horizontal guide can be arranged on the inside or outside of the cage. It is advantageous for the guide for the wheels to be arranged near the midpoint of the height of the cage. The guide can be located on the outside or on the inside. This embodiment is especially advantageous in cases where the elements are mounted on the rotor at a point half way along their length. The guide can be formed by a ring, which simultaneously serves as a point of attachment for the elements.

It is advisable for the axles of the wheels to be connected by shafts to generators, which convert the rotational energy generated at the wheels by the rotor into electrical energy.

In another embodiment, the rotor is provided with floats and is set up to float in a water-filled basin. In this variant, the support system is almost completely free of wear, and there is very low resistance to the movement of the rotor. A guide system of this type is also extremely quiet.

In another embodiment, the rotor is supported by struts on an axle arranged on the axis of symmetry of the cylinder formed by the rotor. Depending on the size of the apparatus, a certain number of circular support strips are attached to the rotor by an appropriate number of struts extending to the center axis, these strips serving to support the elements or as a point of attachment for them.

Combinations of the various alternative support systems are also possible, e.g., a wheel-on-rail support system at the bottom and the previously mentioned struts at the top to prevent tipping in strong winds.

It is advisable for the cage to be provided with a gear rim and to be connected to at least one generator by at least one pinion, which meshes with the gear rim and is preferably mounted inside the cage.

In similar fashion, a return pulley of the previously mentioned endless belt can be provided with a gear rim and be connected to at least one generator by means of at least one pinion, which meshes with the gear rim and is preferably mounted on the inside of the return pulley. The return pulley, furthermore, could be connected to a generator by means of, for example, a shaft and a gear unit.

In another embodiment, permanent magnets or electromagnets are mounted on the rotor or on the base, next to the rotor, for example, to convert the kinetic energy into electrical energy. These magnets induce an electric current in induction coils mounted appropriately on the other side, next to the rotor or on the rotor. In cases where electromagnets are used, it is advantageous that the induction-caused braking action on the rotor can be increased or decreased as a function of the strength of the magnetic field.

According to another embodiment of the invention, the apparatus is provided outside the rotating cage with essentially radially oriented baffles pointing toward the center of the rotor. These have the purpose of focusing the wind onto the cage. Even flows which are outside the cross-sectional area of the cage can thus be conducted onto the cage.

Depending on the embodiment, it is possible to influence the quantity and the direction of the captured flow and to guide it more effectively onto the incident-flow surfaces of the elements.

The baffles are advisably set up in such a way that the flow is directed onto the rotor, i.e., onto the elements, in a direction as close as possible to the radial direction. The upstream sides of the baffles can therefore have different forms. Because it should be possible to focus the flow regardless of the direction from which it is coming, the flow guides can be made up of several individual baffles.

Alternatively, the baffles can consist of several members connected by joints, and the orientation of the members can be changed by pivoting them on the joints.

The position of the baffles is preferably controllable. Their orientation depends on the form of the elements and will be adapted to the intensity of the flow and to the rotational velocity of the rotor. The orientation can be changed even while the apparatus is operating, so that the baffles can be brought into positions appropriate for starting or stopping the apparatus or for adapting to changing flow conditions.

Baffles can also be used to focus the flow onto an endless traveling belt, preferably onto the area between the return pulleys. This increases the cross-sectional area of the flow which can be captured. Focusing onto the area between the return pulleys, furthermore, also increases efficiency, because the flow then acts only on the part of the apparatus where the incident-flow surfaces are optimally oriented.

It is also preferable for the rotor and the baffles to be covered by a roof in the form of a flat, truncated cone. The lower, smaller circular surface is essentially equal to the cross section of the rotor, whereas the upper, larger cross-sectional surface has in particular the same radial dimension as the baffles. The roof increases the capturable cross section of the flow yet again, this time in the height direction. The lower roof surfaces, by which the flow is conducted onto the rotor, advisably comprise roundings to avoid turbulence.

In another embodiment, the baffles are supported so that they can be moved jointly with the roof and thus oriented as a function of the flow direction. The entire apparatus is preferably mounted a certain distance from the ground on supports such as columns.

In another embodiment of the invention, several rotors can be arranged in the apparatus one above the other. In corresponding fashion, flow energy can be captured over a greater height without any increase in the footprint of the apparatus. The rotors in this case can be mounted preferably in a tower, provided with adjustable baffles. If the apparatus is installed in a body of water, the lower rotors can be used to extract water power, whereas the upper ones can be used to extract wind energy The elements and the axis of rotation of the rotors can also be horizontal. In a horizontal projection, the elements in this case will then move vertically. Several of these rotors can be mounted next to each other. It would be possible to imagine a design of this type installed under a bridge.

In another embodiment of the invention, the roof, the baffles, and/or the tower are provided with systems for extracting solar energy, preferably photovoltaic systems.

The apparatus advisably has overhead power lines, by means of which the recovered electrical energy can be transmitted elsewhere directly from the apparatus. The overhead power lines proceed preferably from the roof of the apparatus. Thus the apparatus can also assume the function of a pylon.

In the case of large installations, the interior space can also be used for other tasks such as for converting and storing electrical energy (storage batteries, hydrogen). As a result, the efficiency of the systems is increased even more. Weather-related fluctuations can thus be equalized.

The drawings show exemplary embodiments of the invention:

FIG. 18 shows a top view of an additional apparatus;

FIG. 19 shows a top view of an additional apparatus;

FIG. 20 shows a top view of an additional apparatus;

FIG. 45 shows a top view of an additional apparatus;

FIG. 46 shows a top view of an additional apparatus;

FIG. 47 shows a top view of an additional apparatus;

FIG. 48 shows a top, angled view of the apparatus according to FIG. 47;

FIG. 49 shows a side view of a detail;

FIG. 50 shows a top, angled view of an embodiment of the apparatus;

FIG. 67 shows a top view of details of an embodiment;

FIG. 68 shows a top view of details of an embodiment;

Figure 1:
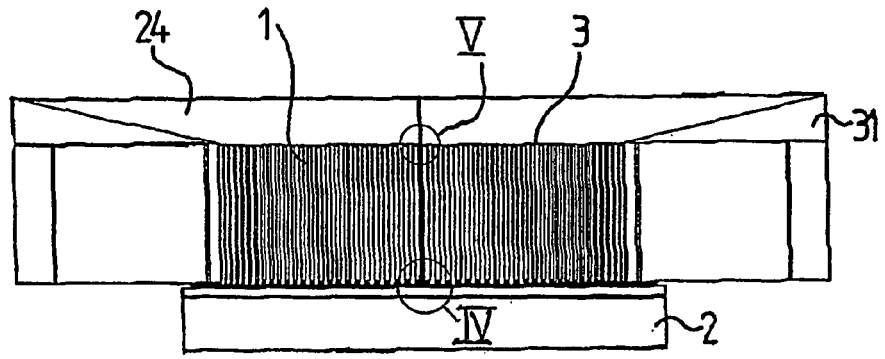
FIG. 1 shows an overall view of a first apparatus for using wind energy.

In a first exemplary embodiment, the individual elements, as illustrated in FIG. 1, are connected to form a cage 1. This cage 1 is supported on a base 2, on which it rotates. In addition, the cage 1 is supported at the top 3.

Figure 2:
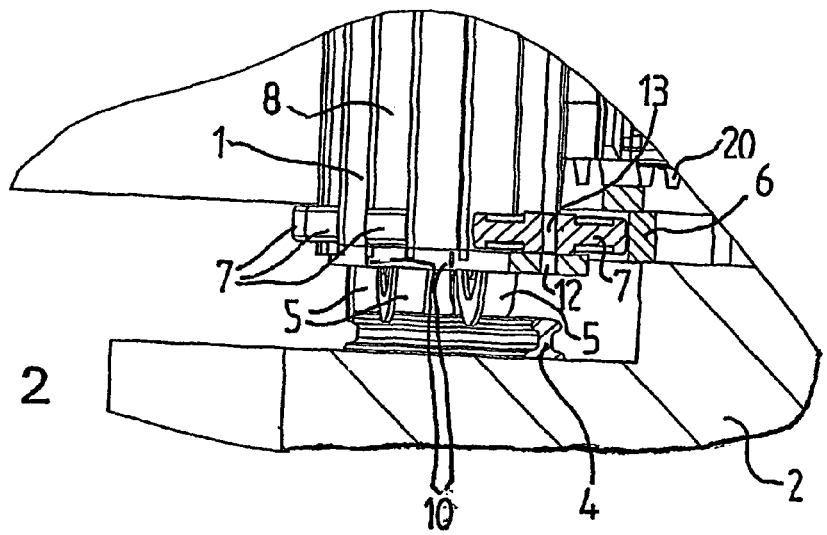
FIG. 2 shows a detail of the lower part of the apparatus according to FIG. 1 on an enlarged scale.
Figure 4:
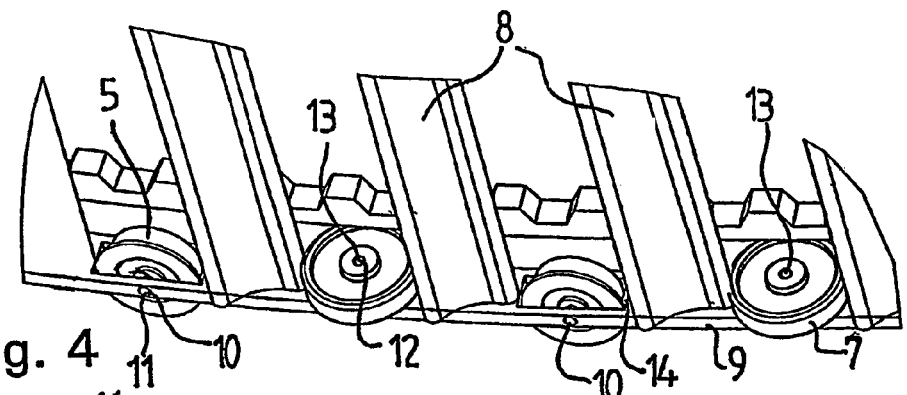
FIG. 4 shows detail IV of FIG. 1 on an enlarged scale.
Figure 5:
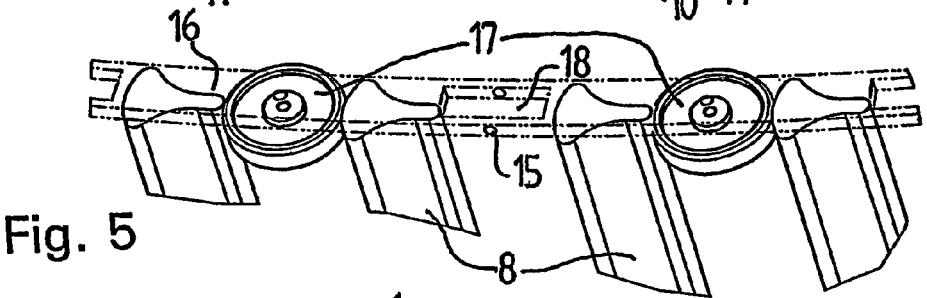
FIG. 5 shows detail V of FIG. 1 on an enlarged scale.

The support system is shown in FIGS. 2, 4, and 5. As can be seen in FIG. 2, two wheel-and-rail systems, one vertically, the other horizontally oriented, are mounted on the base 2. The rail 4 is mounted in the vertical direction, and wheels 5, which are mounted vertically and spaced a certain distance apart, roll along it and carry the cage 1. The rail 4 is circular in correspondence with the shape of the cage.

The horizontal guide shown in FIG. 2 consists, first, of the rail 6, which is shown in cross section. This rail is oriented horizontally outward with respect to the center of the cage. Second, the horizontal guide consists of the horizontally supported wheels 7, which can be seen both in cross section and also in perspective.

The wheel-and-rail systems described above are illustrated in detail in FIG. 4. The elements 8, which form the cage 1, stand on a strip 9, which serves both as a support 10 for the axles 11 of the vertical wheels 5 and as a support 12 for the axles 13 of the horizontal wheels 7. For this purpose, the strip is provided with the appropriate cutouts 14 and holes 15. The elements 8 are mounted on the cage far enough apart from each other that the wheels 5 or 7 can be installed between them. The vertical wheels 5 and the horizontal wheels 7 alternate with each other between the elements 8. FIG. 5 shows the support system provided at the top 3. The strip 16 at the top is designed exactly like the strip 9 at the bottom. The elements 8 are supported on the strip 16 at the top in a manner similar to that used for the strip 9. Here, however, only one wheel-and-rail system, namely, a horizontal one, is used to guide the cage, the wheels 17 rolling along the top rail (not shown). The cutouts 18 for the vertically oriented wheels remain empty.

Figure 6:
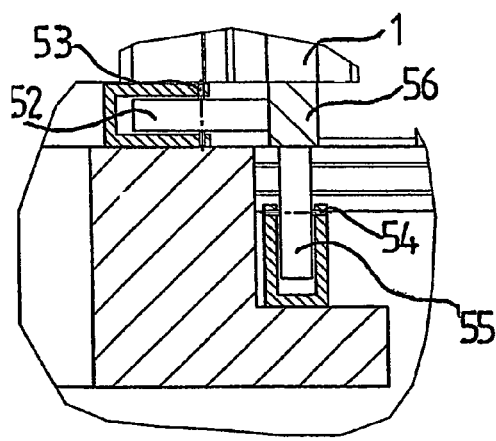
FIG. 6 shows detail IV of another embodiment of the apparatus according to FIG. 1 on an enlarged scale.

FIG. 6 shows an alternative support system, in which the wheels 52, 55 are mounted on the base 2. The bottom edge 56 of the rotor 1 now rides directly on the rollers 52, 55. It is no longer absolutely necessary to have rails in this case, but they can be advantageous. The rollers 52, 55, which are supported on the axles 53, 54, no longer move along with the rotor. Thus the moving mass is smaller, and the wind energy can be used more efficiently.

Figure 25:
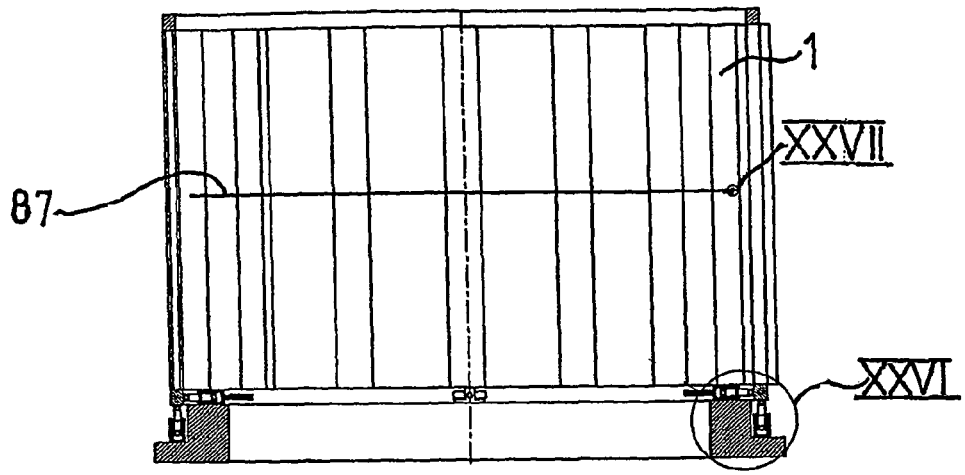
FIG. 25 shows a side view of parts of another embodiment.
Figure 26:
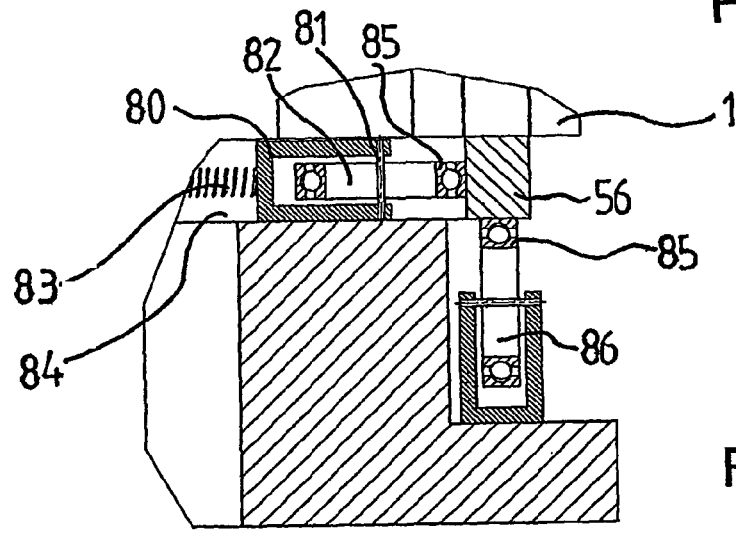
FIG. 26 shows detail XXVI according to FIG. 25.
Figure 27:
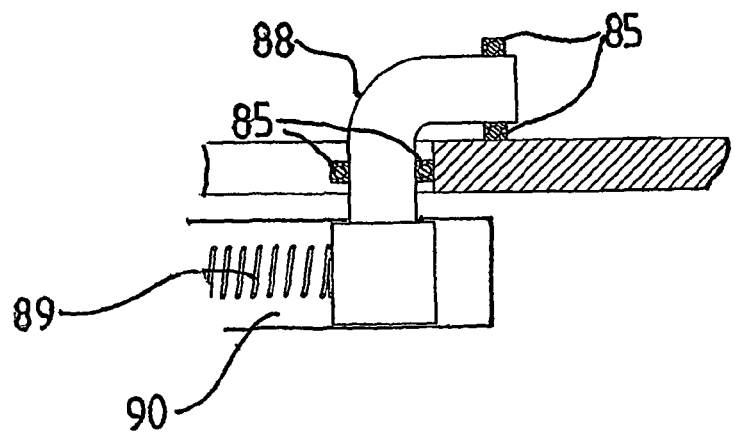
FIG. 27 shows detail XXVII according to FIG. 25.

FIGS. 25, 26, and 27 show another embodiment of the support system for the rotor 1. As in the example shown in FIG. 6, the wheels are mounted on the base 2. The lateral support systems 80, in which the axles 81 of the wheels 82 are mounted, are held and horizontally guided by springs 83. Thus the support system 80 can adapt to irregularities in the shape of the rotor 1. The guide 84 has outward-oriented and inward-oriented stops, which act in the horizontal direction and thus limit the extent to which the rotor 1 can displace the support system 80. The wheels are provided with ball bearings 85, on which the bottom edge 56 of the rotor 1 rides. The rotor can shift horizontally on the vertically supporting lower wheels 86.

A ring 87 is provided on the inside of the rotor 1 to provide stabilization against tipping. Columns, to which the retainers 88 are fastened, stand on the inside of the rotor in the apparatus. These retainers grip the ring 87 laterally and from above. Six of these retainers 88 spaced equal distances apart are provided on the columns.

FIG. 27 shows the retainer 88 in detail. Its horizontal movement is guided from one side, and it is held in place by a spring 89. In analogy to the example described previously, the guide 90 comprises two stops acting in the horizontal direction. Two ball bearings 85 are mounted on each retainer 88, one of which acts on the ring horizontally, the other vertically from above.

Figure 28:
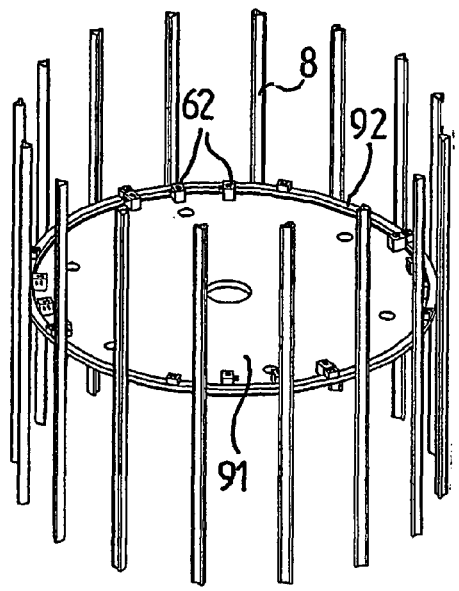
FIG. 28 shows a top, angled view of some of the parts of an embodiment of the apparatus.
Figure 29:
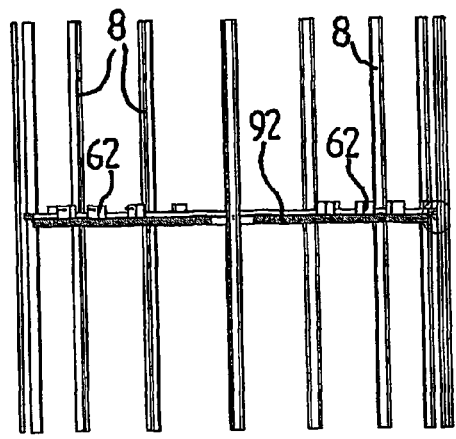
FIG. 29 shows a side view of some of the parts of an embodiment of the apparatus.
Figure 30:
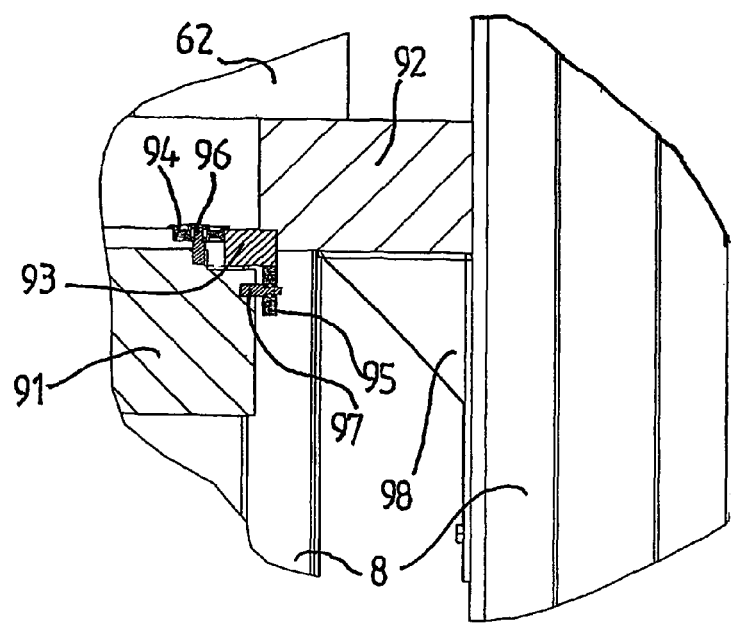
FIG. 30 shows details of an embodiment according to FIGS. 28 and 29.

FIGS. 28 and 29 show a different exemplary embodiment of a retainer for the elements 8, in which the elements 8 are held in place not at the top and bottom but rather only at their midpoints. The elements 8, as shown in FIG. 30, are attached to a ring 92, which is supported with freedom of horizontal rotation on a circular retaining surface 91. To improve the stabilization, a retaining element 98 is provided on the ring 92 and also on the elements. The support system for the ring 92 on the retaining surface 91 comprises a support element 93, which is held in place by wheels 94, 95, mounted on axles 96, 97, which are attached to the retaining surface 91. Thus the ring 92 can rotate together with the elements around the stationary retaining surface 91. To prevent tipping toward one side, the horizontally mounted wheels 94 are provided with a wheel flange.

It would also be possible to attach the rotor 1 and the retaining ring 92 to the inner baffles shown in FIGS. 18-20 and 59-60. A retaining surface 92 would not be required in this case.

Figure 7:
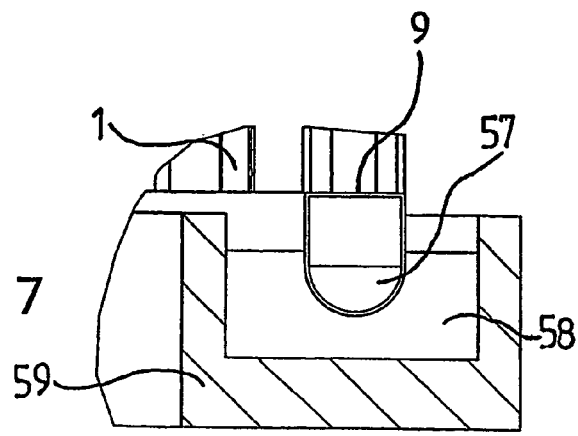
FIG. 7 shows detail IV of another embodiment of the apparatus according to FIG. 1 on an enlarged scale.
Figure 8:
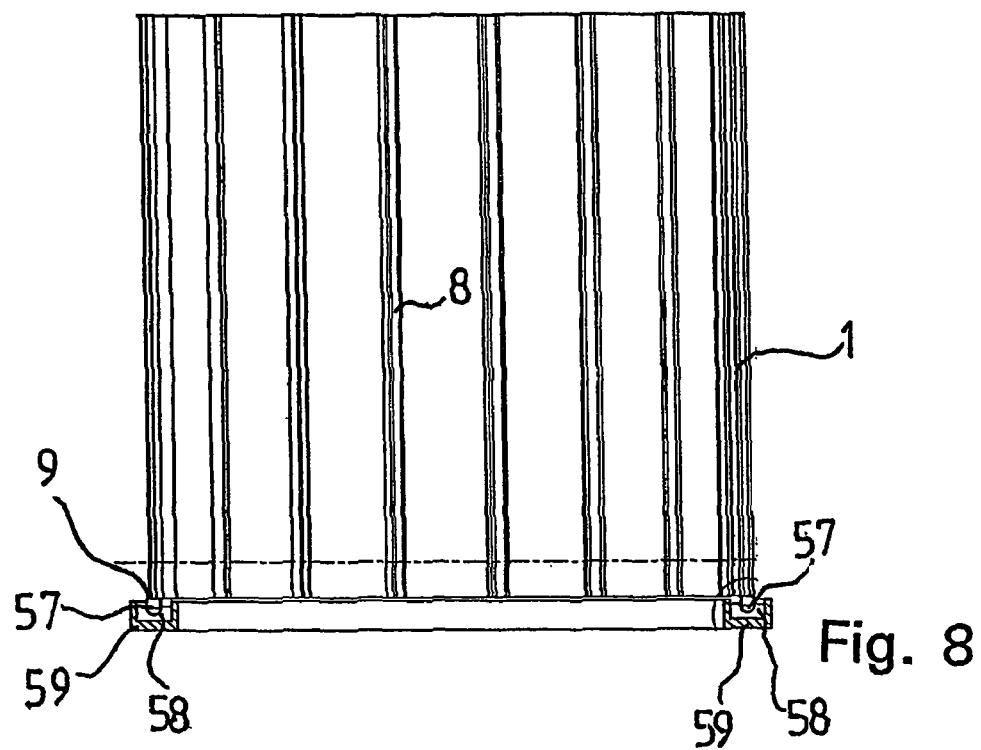
FIG. 8 shows a side view of some of the parts of an embodiment of the apparatus.

In another embodiment, the rotor 1 is supported on floats 57 in a water-filled basin 59. As can be seen in FIGS. 7 and 8, the basin 59 is concentrically arranged precisely underneath the support strips 9 of the rotor 1. The floats 57 are attached to the bottom side of the support strips 9. A similar support system is also possible for the variant of the apparatus shown in FIG. 11.

How the kinetic energy of the rotor is transformed into electrical energy is discussed in the following.

Figure 3:
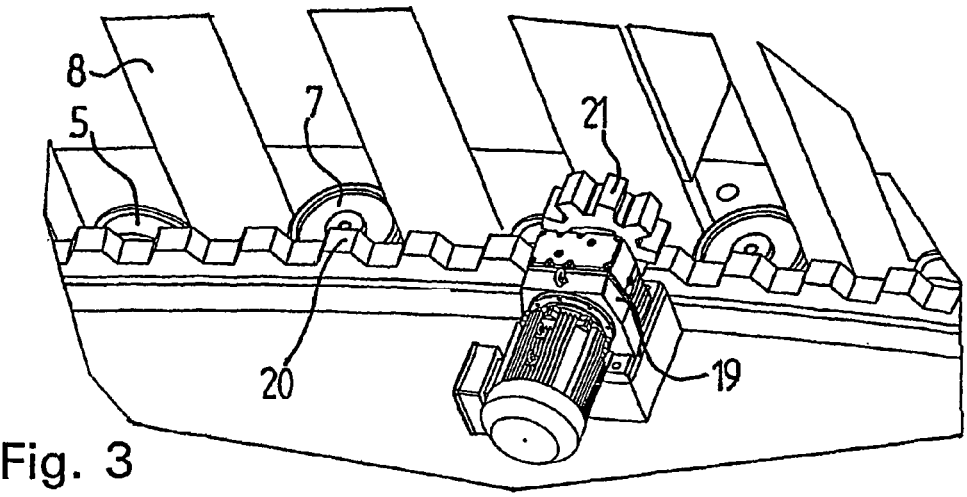
FIG. 3 shows another detail of the lower part of the apparatus according to FIG. 1 on an enlarged scale.

FIG. 3 shows a gear wheel, by means of which the rotational energy of the cage 1 is transmitted to generators 19. It consists of a gear wheel 20, which, as can also be seen in FIG. 2, is mounted on the inside of the cage, and a pinion 21, which is seated directly on the shaft of the generator 19. When the cage rotates, the pinion 21 turns and thus drives the generators 19.

Figure 63:
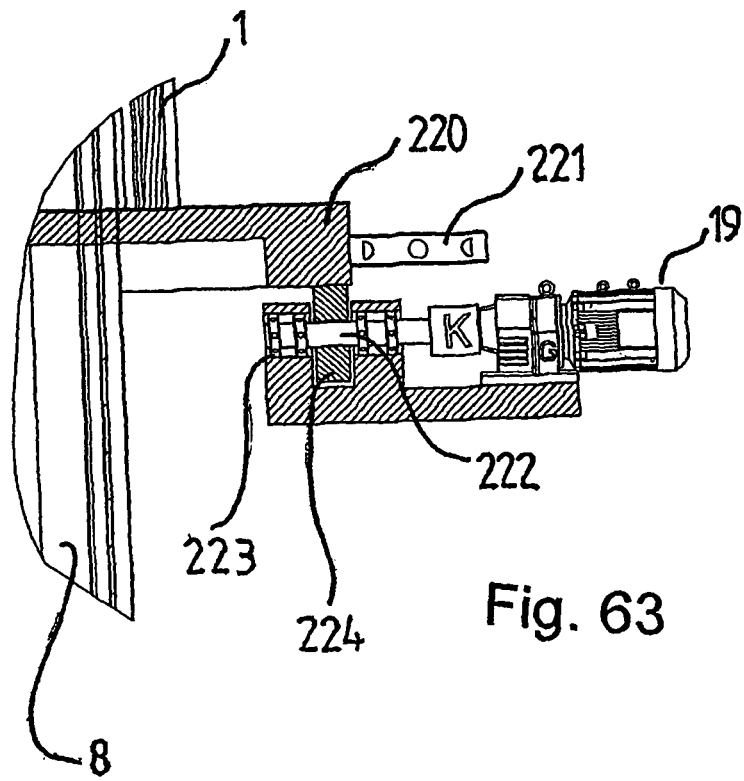
FIG. 63 shows a side view of a detail.
Figure 64:
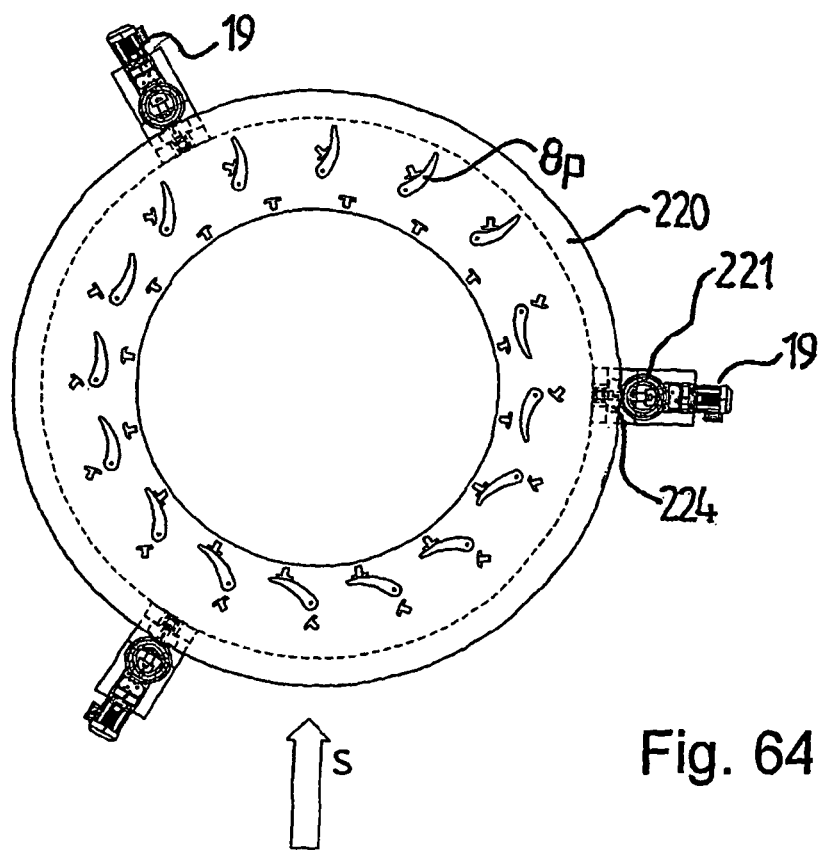
FIG. 64 shows a top view of another apparatus.

An alternative possibility for transmitting the rotational energy is shown in FIG. 63. Here the elements 8 are attached to a ring 220. The ring 220 itself, as can also be seen in FIG. 64, is held in place laterally by horizontally arranged wheels 221. The weight of the rotor 1 is supported by carrier wheels 224, on which the ring 220 rides. Several of these load-bearing carrier wheels 224 are arranged around the ring. The carrier wheels 224 comprise axles 222, which are mounted in bearings 223 on both sides of each wheel 221 and are connected to generators 19 by a shaft. When the rotor 1 turns, the ring 220 rotates the carrier wheels 224. The rotational energy thus produced is converted to electrical energy in the generator 19. A similar type of energy conversion is also possible for the exemplary embodiment according to FIG. 6.

Figure 9:
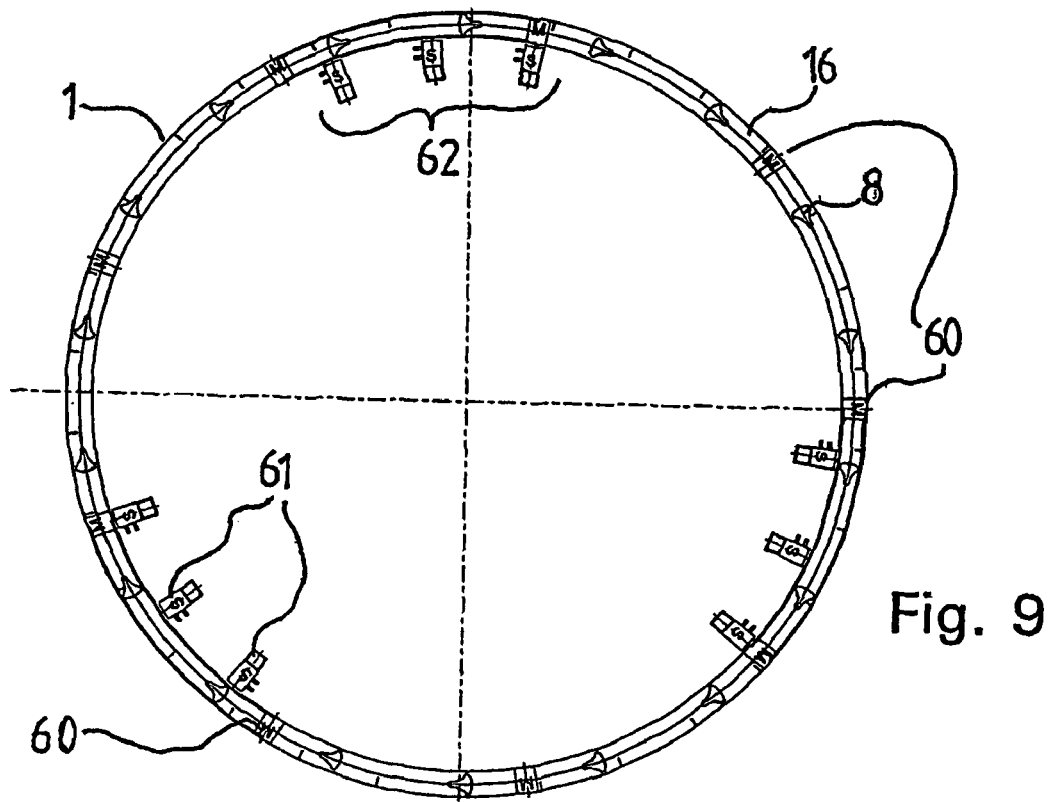
FIG. 9 shows a top view of some of the parts of an embodiment of the apparatus.

In a different exemplary embodiment, FIG. 9 shows how equally spaced-apart electromagnets 60 are mounted on the carrier strip 9 of the rotor 1. Coils 61 are arranged on the base 2, near the inside surface of the rotor 1. When the rotor 1 turns, voltage is induced in the coils. The coils 61 are arranged in three groups 62, each group comprising three coils 61. The distance between the electromagnets 60 on the rotor 1 is greater than the distance between the first and the third coil 61 of a group 62. It is advantageous that there is never more than one magnet inducing voltage in a coil group 62 at a time. Other arrangements of coils 61 and magnets 60 could also be imagined. Because it is now possible, when electromagnets are used, to use the intensity of the magnetic fields to control the braking action, the rotor can be braked to an appropriately greater degree in strong winds, for example, whereas, when the winds are weak, correspondingly weaker magnetic fields will be applied.

Figure 11:
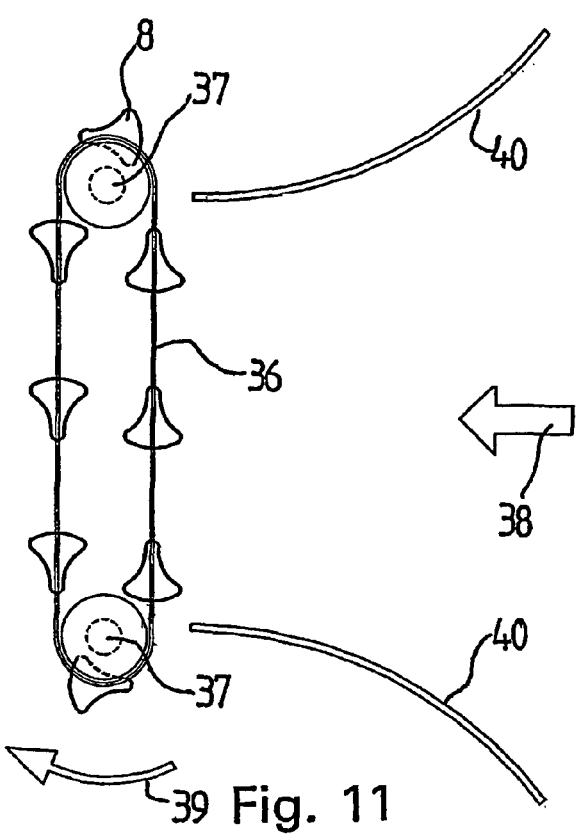
FIG. 11 shows a schematic diagram of a second apparatus for using wind energy.
Figure 12:
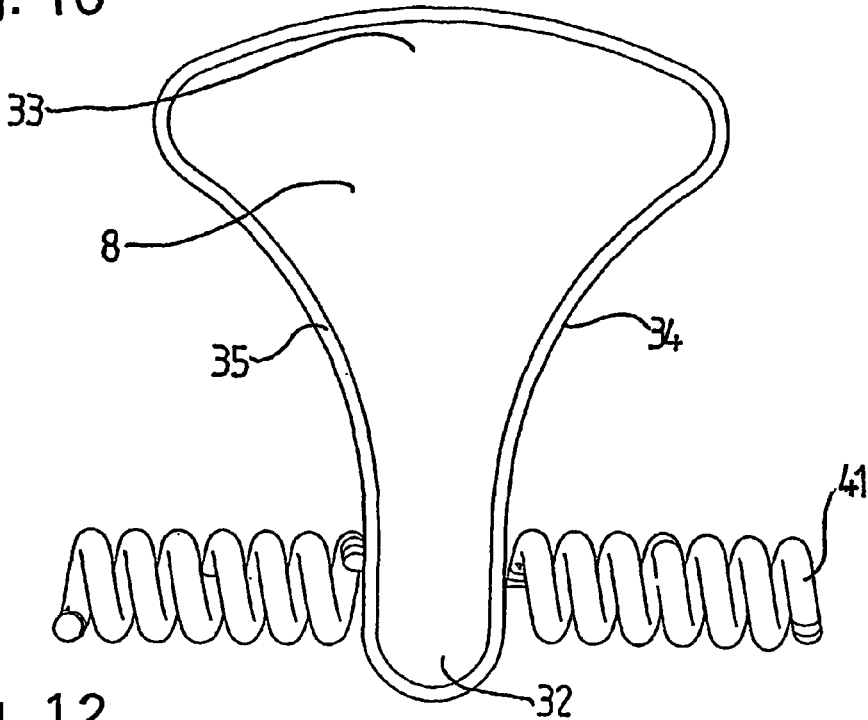
FIG. 12 shows a top view of another detail.

FIG. 12 shows an embodiment of the elements 8. They are symmetric and triangular overall, but rounded. They comprise a narrow part 32 and a wide part 33. The flanks 34 and 35 on the two sides are the incident-flow surfaces. The direction of movement during the capture of the wind energy is indicated in FIG. 11 by an arrow 39. Because the elements have two incident-flow surfaces, they can take up wind energy on the side facing the wind and also on the side facing away from wind and thus contribute to the movement of the cage.

The portion of the wind not captured on the upstream side thus passes through the cage and is captured on the downstream side.

Figure 74:
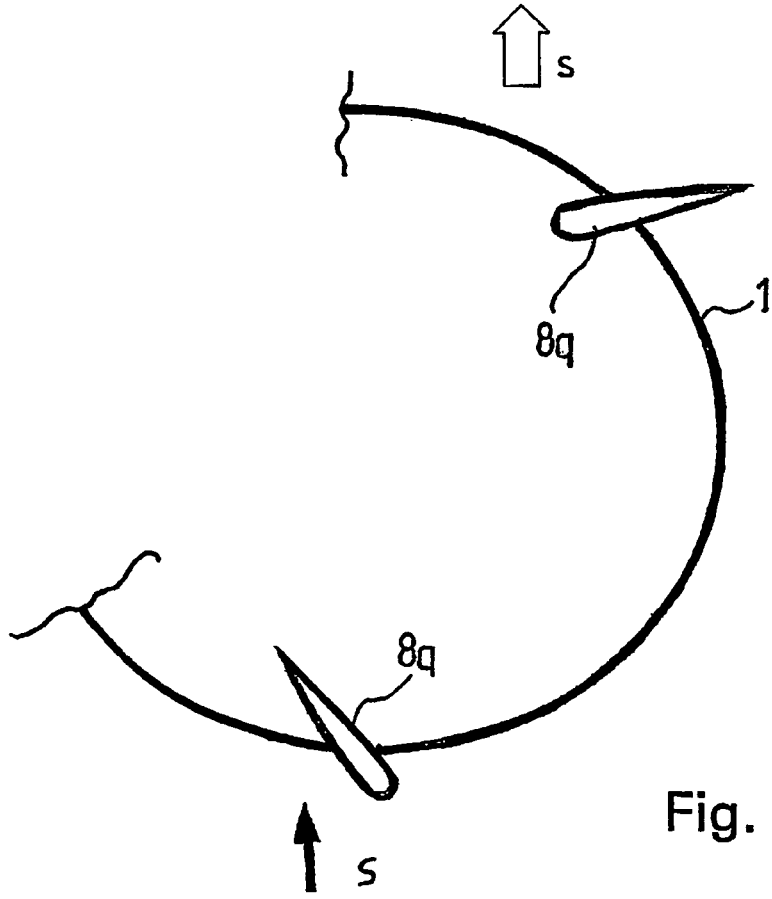
FIG. 74 shows a top view of parts of another apparatus.

The elements 8*q* shown in FIG. 74 have the shape of a symmetric drop. It is advantageous that the aerodynamic shape can contribute to the rotation on the side of the rotor 1 facing the wind and also on the side facing away from the wind.

Figure 36:
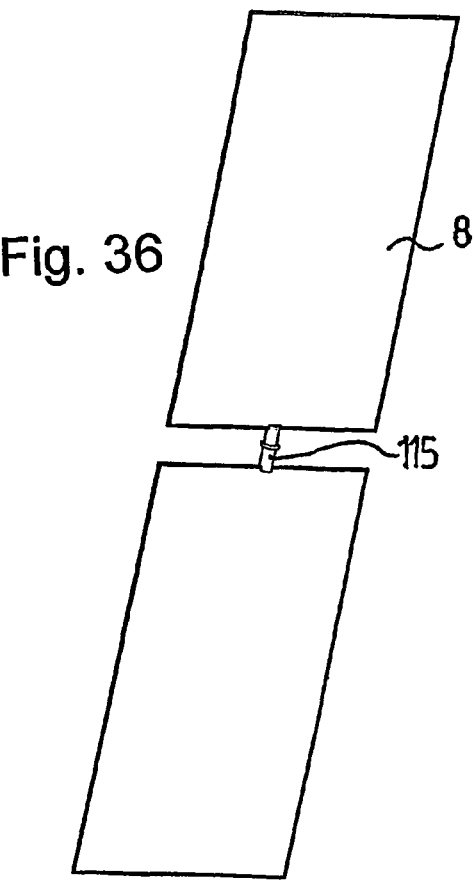
FIG. 36 shows an embodiment of parts of the apparatus.

FIG. 36 shows another embodiment of the elements 8 suitable for the central support system shown in FIGS. 28 and 29. The element 8 is divided into an upper part and a lower part, which are connected by a connecting part 115. The surfaces of the upper and lower parts are flat and are preferably formed by a tautly stretched covering of sailcloth. The connecting part 115 also serves as a way to attach the elements.

Figure 13:
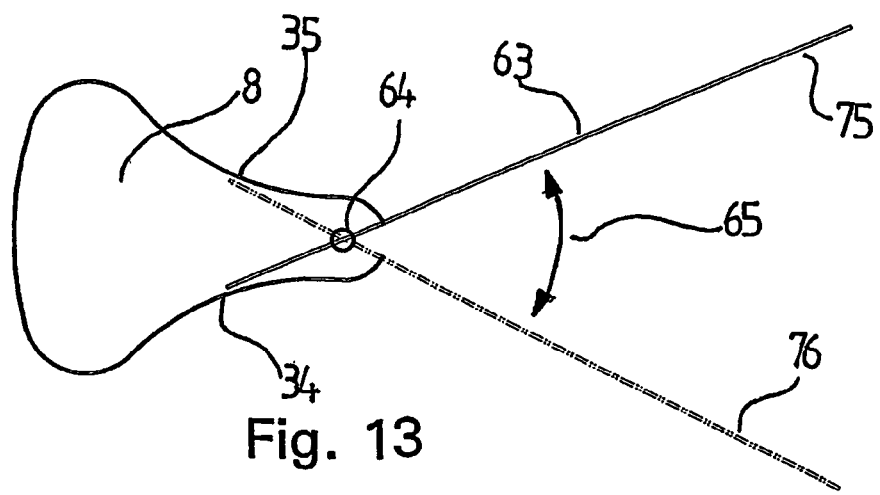
FIG. 13 shows a top view of details of an embodiment.

In an elaboration, panels 63 are mounted pivotably on joints 64 to enlarge the surfaces 34, 35 of the element 8 at the edge between the two incident-flow surfaces. As can be seen in FIG. 13, the panels 63 assume either one of two stable positions 75, 76 in the wind. They can change between the two positions 75 and 76 by swinging around the joint axis 64, as indicated by the arrow 65. The positions 75, 76 are designed in such a way that the panel 63 is essentially parallel to the side 34, 35 of the triangle upon which the wind impinges.

Figure 14:
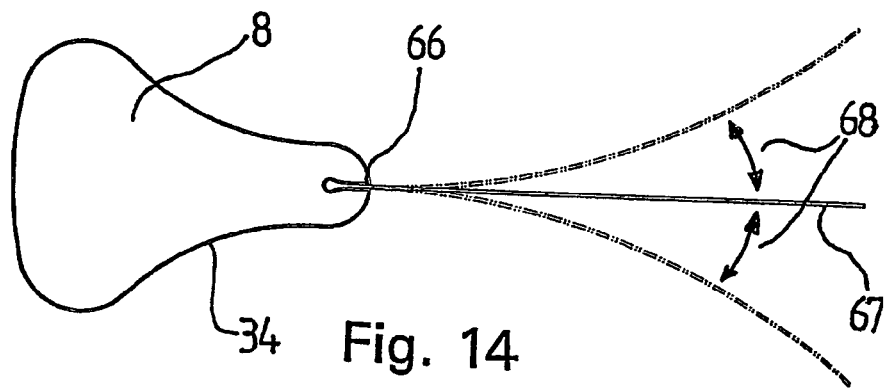
FIG. 14 shows a top view of details of another embodiment.

In another elaboration, an elastic plastic panel 67 is fitted into the edge 66 of the element. In FIG. 14, the arrows 68 show how the panel 67 bends as a function of the direction of the incoming air. It is advantageous that the area of the profile surface upon which the wind directly impinges thus changes as a function of the intensity of the wind, because the degree of bending increases with the strength of the wind. The elements 8 and the panels 67 can be produced jointly by coextrusion.

In yet another embodiment, the elements themselves, as indicated in FIG. 12, are held in place by springs 41. Because the elements will tip in a strong wind, the load on the elements facing the wind is reduced and thus greater stability of the apparatus can be guaranteed.

Figure 41:
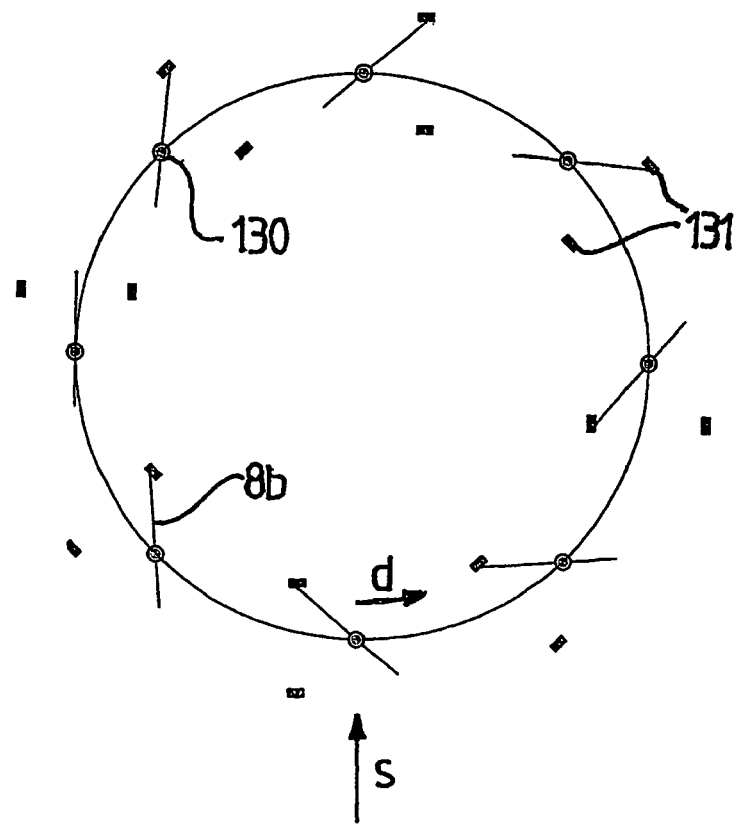
FIG. 41 shows a top view of an additional apparatus.

Various embodiments of the elements, designated 8*b*-8*g*, are shown in FIGS. 41-47 along with the corresponding support systems and guides. FIG. 41 shows flat elements 8*b*, each rotatably supported on a bearing 130; each element orients itself as a function of the flow direction "s". The degree of deflection is limited by the retainers 131, which are carried along with the rotor and are mounted on the rotor's outside surface next to the elements. When the elements 8*b*, as they travel around in the rotational direction "d" of the rotor 1, start to move in the direction opposite to the flow direction "s", they orient themselves in the direction of the wind.

Figure 42:
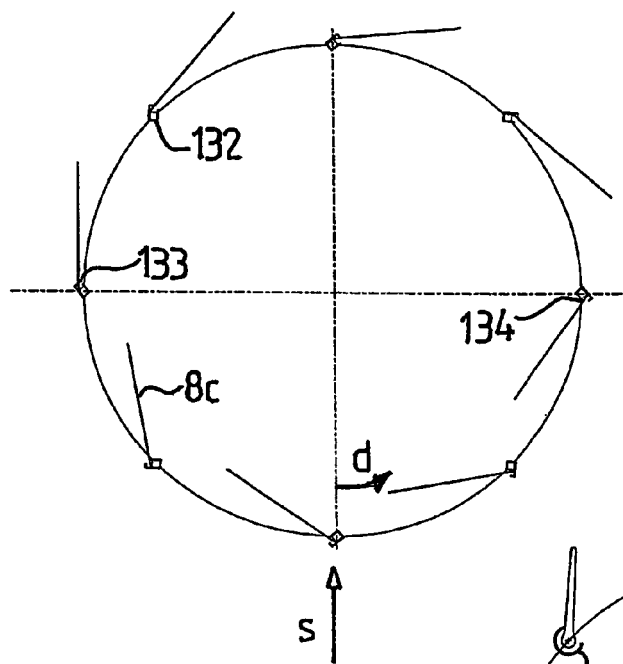
FIG. 42 shows a top view of an additional apparatus.

In another embodiment shown in FIG. 42, each flat element 8*c* is supported on the outside surface of a rectangular spar 132. The two sides 133 and 134 of the spar limit the outward deflection of the elements 8*c*. As a function of the wind direction "s" and the rotational direction "d", the elements 8*c* orient themselves in such a way that the flow energy which they capture either contributes to the rotation of the rotor or no longer exerts any braking action on it. The flowing medium pushes the elements 8*c* against the maximum deflection stop. In cases where the flowing medium is wind, the elements 8*c* can also consist of sailcloth.

Figure 43:
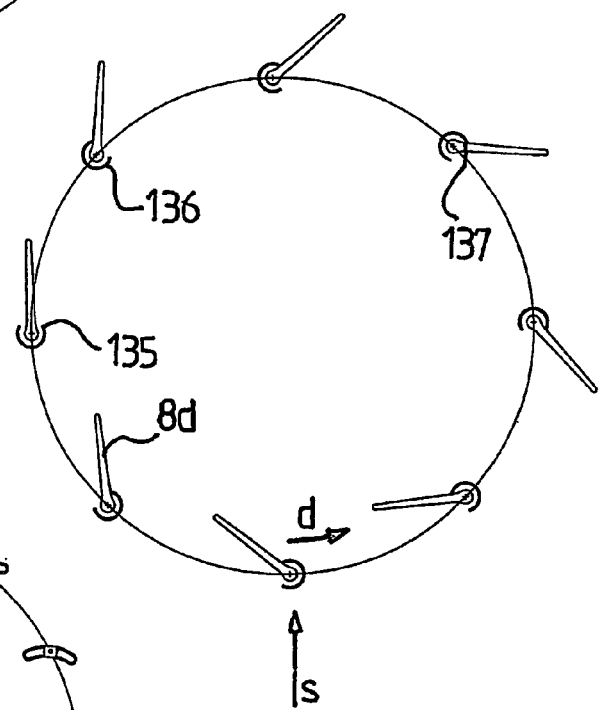
FIG. 43 shows a top view of an additional apparatus.

An exemplary embodiment with circular spars 136 with the stop points 135 and 137 is shown in FIG. 43. The elements 8*d* are supported in the circular spars and orient themselves, as described above, as a function of the wind direction "s".

Figure 44:
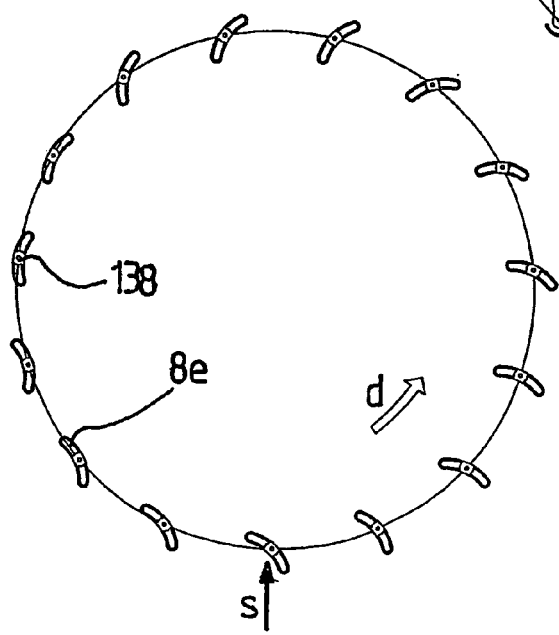
FIG. 44 shows a top view of an additional apparatus.

FIG. 44 shows another embodiment of the elements 8*e* as extruded sections, which are rotatably supported at their midpoints 138. As described below, the elements are individually controlled and adapted to the direction of the wind as a function of their position on the rotor. On the side located on the right with respect to wind direction, the elements 8*e* assume a position perpendicular to the flow, because this contributes to the rotation of the rotor in direction "d". On the left side, they assume a position which is largely parallel to the flow direction "s", so that they absorb the least possible amount of flow energy and thus exert only a minimal braking action on the rotation. It is also possible to find a position for the elements 8*e*, such as a position in which they are parallel to the flow direction, for example, where the rotor does not turn at all. This can serve the purpose of keeping the rotor in a rest position under extremely windy conditions.

FIG. 45 shows a rotor which functions in a manner similar to that of FIG. 44. In this embodiment, symmetrical sections 8*f* are used. The advantage here is that the elements do not have to be able to rotate a full 180°, as is necessary on the left side of the exemplary embodiment according to FIG. 44.

FIG. 46 shows another embodiment of the elements 8*e* shown in FIG. 44. The elements 8*g* are not formed as extruded sections but rather made of sailcloth.

Tragflächenform

Figure 62:
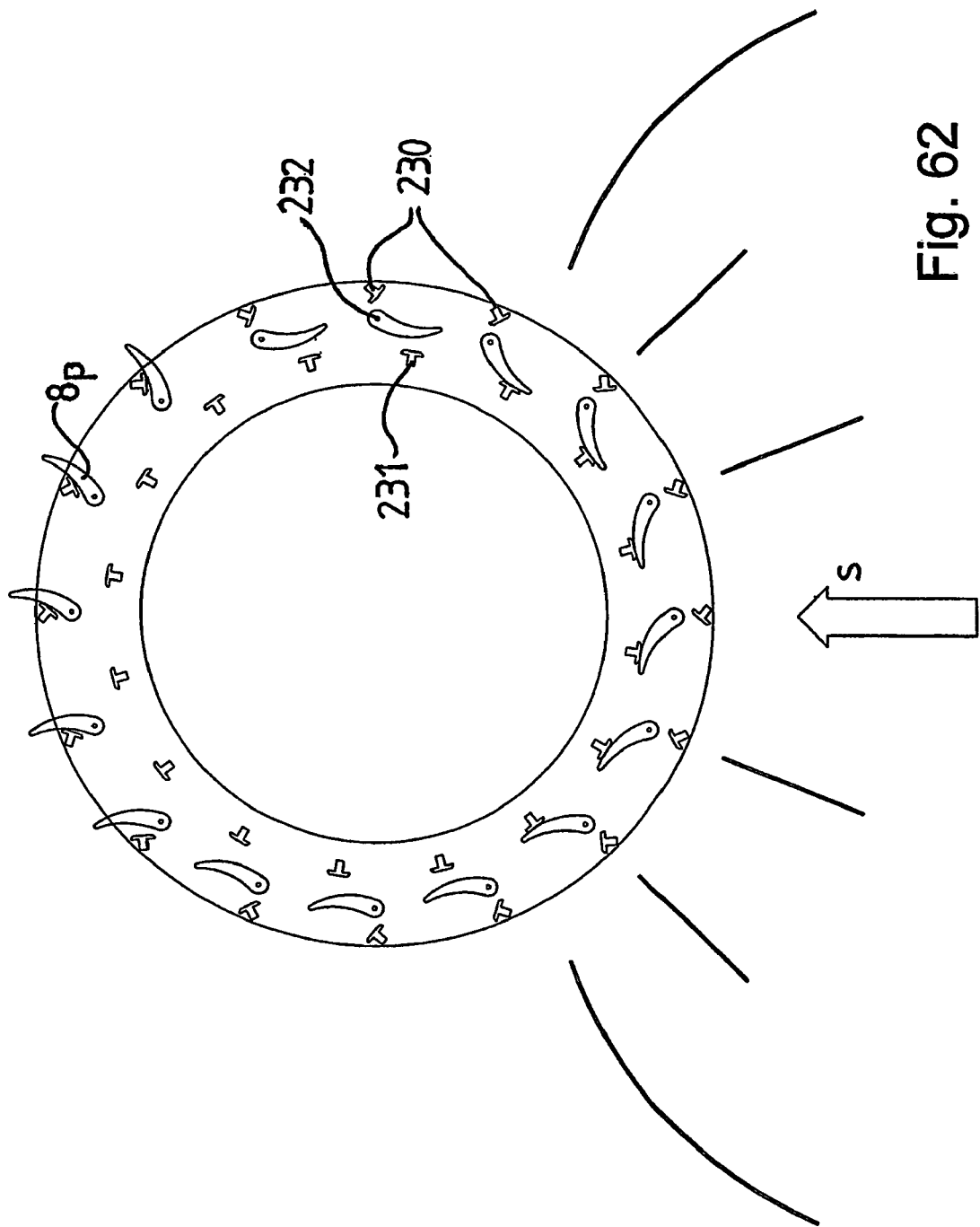
FIG. 62 shows a top view of an additional apparatus.

FIG. 62 shows elements 8*p*, which, in cross section, have the aerodynamic form of aircraft lifting surfaces. On the thicker side of the cross-sectional airfoil, the elements 8*p* are supported rotatably at the point designated 232, so that they can align themselves with the direction of the wind. Inner stops 231 and outer stops 230 are also provided next to the elements 8*p* to limit the rotational movement of the elements 8*p*. The stops are arranged in such a way that the force exerted on the elements 8*b*, because of the airfoil shape, supplies the greatest possible contribution to the rotation of the rotor 1.

Figure 65:
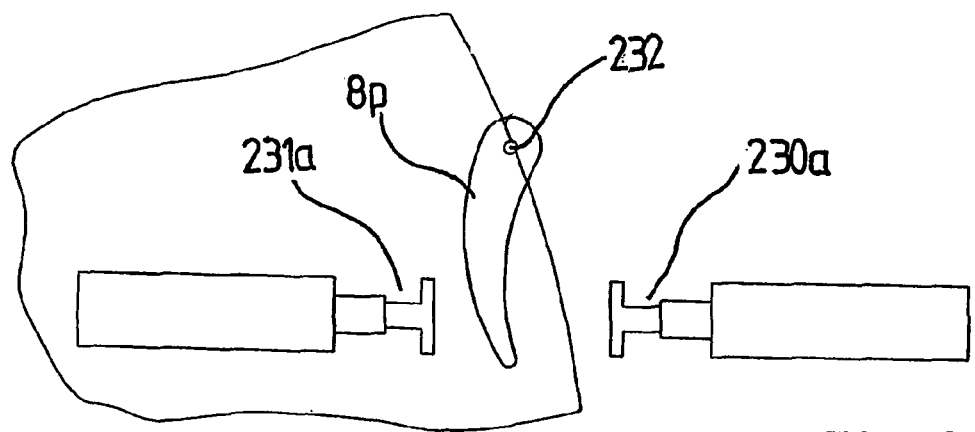
FIG. 65 shows a top view of a detail according to FIG. 64.

The stops themselves can also be adjustable. The stops 230*a* and 231*a* shown in FIG. 65 can be moved by a pneumatic adjustment system. The rotational play and the orientation of the elements 8*p* can therefore be changed as a function of the position of the individual element 8*p* on the rotor 1 even while the rotor is turning.

In the exemplary embodiment according to FIG. 47, four strips 144 are mounted on the rotor, on each of which three elements are mounted in a fixed position. While the rotor is turning in rotational direction "d", the strips 142 are oriented around an axis 141 as a function of the wind direction "s". It is advantageous here that fewer control points are therefore required than in the case of the examples of FIGS. 44-46. FIG. 48 shows a side view of a rotor according to FIG. 47. Sets of three elements 8*g* mounted on strips 142 are arranged both above and below the support and the axis of rotation 141.

FIGS. 49-55 show various embodiments of elements which have through-openings for the flowing medium. An element 8*h* of this type, comprising an upper and a lower part, is shown in FIG. 49. It comprises a retaining part 150, which connects the two parts and serves to support the element. The element 8*h* consists of a frame 154, in which rods 153, which carry the shutters 151, are guided. The shutters can be supported with freedom to move, as shown in FIGS. 51*c* and 51*d*, and thus adjusted to suit the intensity of the wind. The maximum deflection of the shutters 151 can be determined by a stop in the support system or, as shown in FIG. 51*d*, they can be held by cables 154. The arrangement of the elements 8*h* on a rotor is shown in FIG. 50. The elements 8*h* are supported rotatably on the rotor at the retaining element 150 and can therefore be adjusted as a function of the wind direction. The shutters 151 are arranged symmetrically to the retaining element 150.

Figure 51:
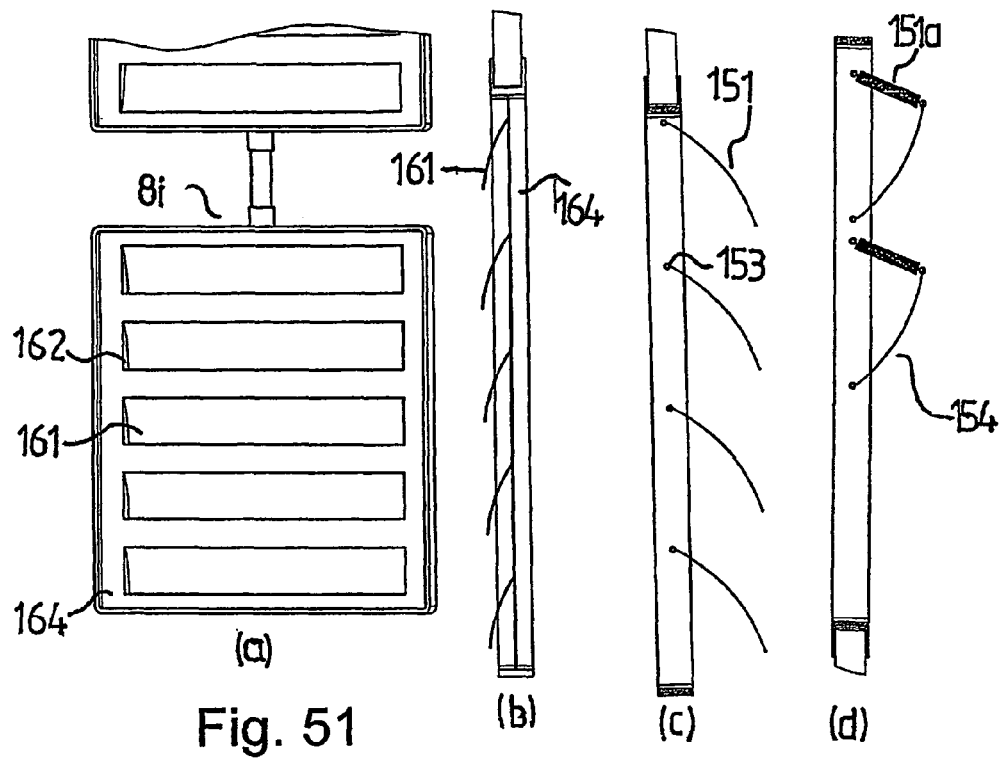
FIG. 51 shows a side view of additional details.
Figure 52:
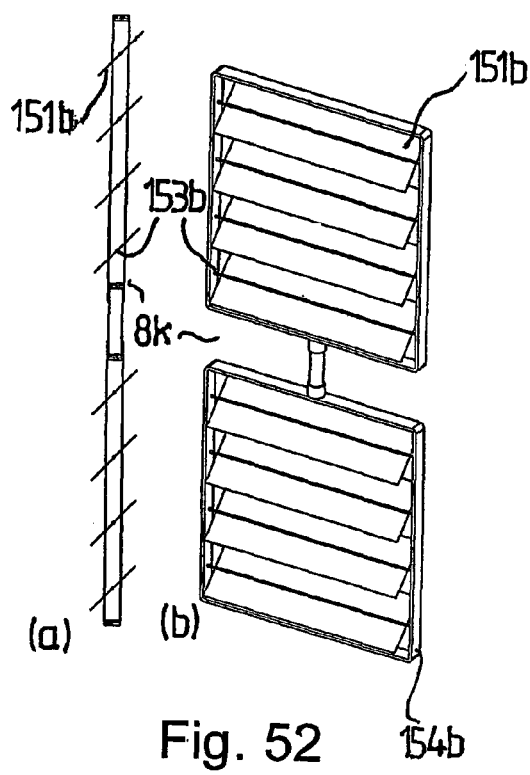
FIG. 52 shows a side view of additional details.
Figure 53:
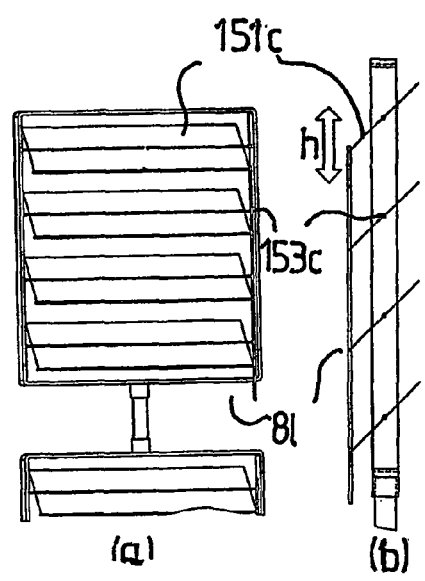
FIG. 53 shows a side view of additional details.

In another exemplary embodiment for an element with through-openings, FIG. 51 shows an element 8*i* with fixed shutters 161. Another design of such elements 8*k* can be seen in FIG. 52, in which the shutters 151*b* are rigidly supported in the middle on retaining rods 153*b* mounted in a frame 154*b*. In another embodiment, the orientation of the shutters can be adjusted in the direction shown by the double arrow H, as shown in FIG. 53. In this way, the elements 8*i* can be adapted to the intensity of the flow.

Figure 54:
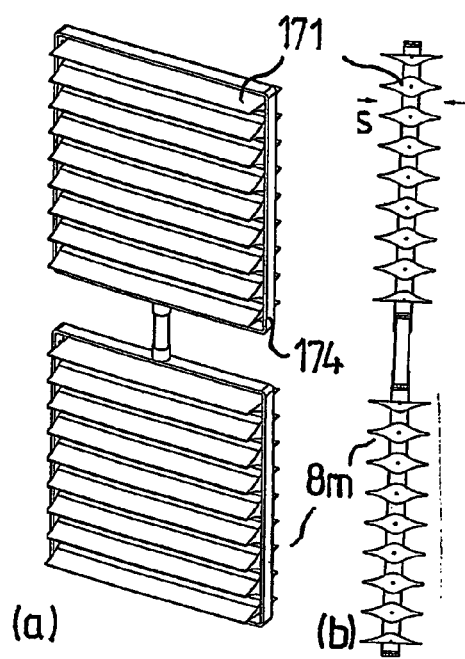
FIG. 54 shows a side view of additional details.

FIG. 54 shows an element 8*m*, in which through-openings for the flowing medium are formed between symmetric extruded sections 171. These elements 8*m* are suitable for accepting flow energy from both sides.

Figure 55:
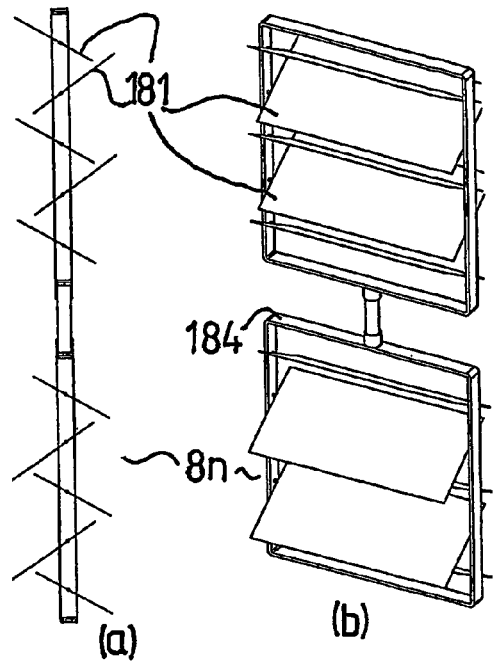
FIG. 55 shows a side view of additional details.

The element 8*n* shown in FIG. 55 is provided with shutters 181, which are mounted in a frame 184 so that adjacent shutters tilt in opposite directions. Flow energy can also be accepted from both sides of the elements 8*n* in this arrangement also.

In principle, the various embodiments of the elements described above can be combined with each other in the rotor. The rotor then comprises different elements. The apparatus can be more easily adapted to weather-related flow conditions by combining the advantages of the various element forms.

Figure 15:
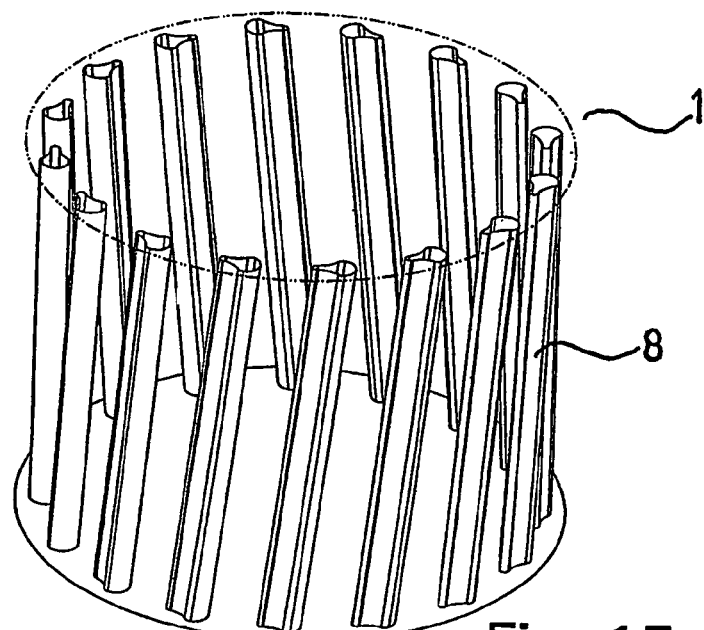
FIG. 15 shows a top, angled view of parts of another embodiment.
Figure 16:
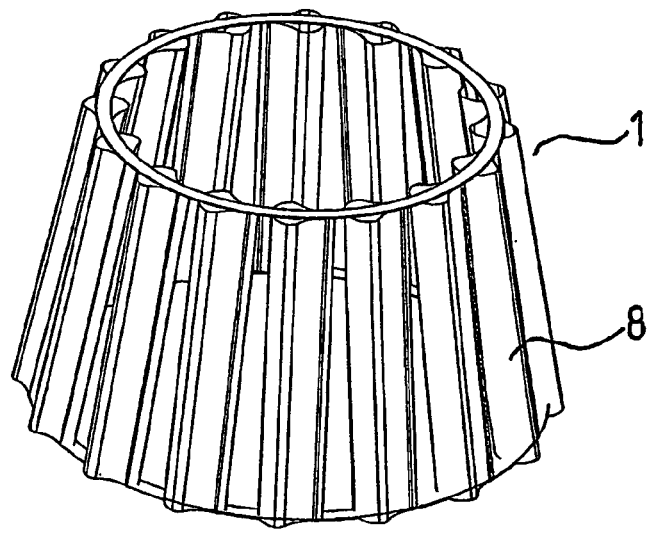
FIG. 16 shows a top, angled view of parts of another embodiment.

In another embodiment, the elements 8 are arranged in the rotor 1 so that they tilt relative to the axis of rotation. In FIG. 15, the elements 8 are tilted tangentially to the circular form of the cage. In FIG. 16, they are tilted inward toward the center of the circle. In both cases, in addition to the force component which causes the rotor to turn, the wind also produces a force component on the rotor which acts vertically toward the ground and thus stabilizes the operation of the rotor 1. With an orientation such that the force component acts in the direction opposite that of the force of gravity, for example, the rotor experiences a certain amount of lift, and the resulting decrease in the force of gravity acting on the support system has the effect of reducing friction and wear.

In an elaboration of the invention, the elements 8 can be supported on their retainers in the rotor so that they can rotate individually. Depending on the direction of the wind and the position of the individual element on the rotor, the elements 8 can be turned horizontally by means of the orientation system 99 shown in FIGS. 34 and 35. For this purpose, the support of each element 8 is provided with a gear wheel 111 surrounding the element. Another gear wheel 112, which cooperates with a motor 113, meshes laterally with the first gear wheel. The motor 113 is attached by the retaining element 114 to the ring 92. By means of a control unit, the motor 113 can move each element 8 so that it remains in the desired position at all times even while the rotor is turning. The apparatus can thus be adapted during operation to the direction and intensity of the wind and to the rotational velocity of the rotor 1. FIG. 44 shows one way in which the various elements can be positioned in relation to the flow direction.

Especially when the elements have an aerodynamic shape, the flow velocity plays a significant role, because a relatively high flow velocity is required before the shape will generate a significant amount of lift. For this reason, the individual elements will be oriented during the startup or braking phase in such a way that they supply the greatest possible contribution to the type of movement in question. In cases where the apparatus should not be allowed to turn because of excessive wind, furthermore, the elements can be oriented in such a way that the flow moves the rotor as little as possible or not at all.

Figure 31:
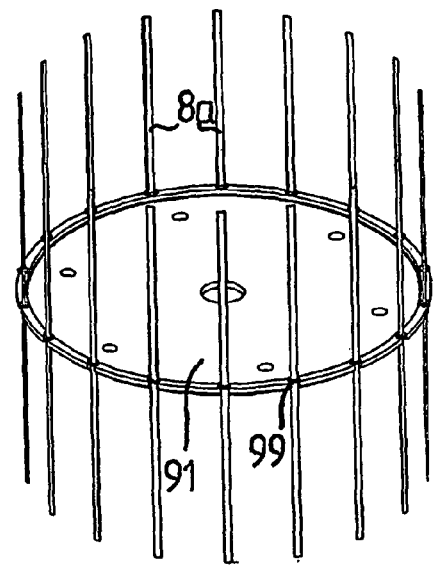
FIG. 31 shows a top, angled view of some of the parts of an embodiment of the apparatus.
Figure 32:
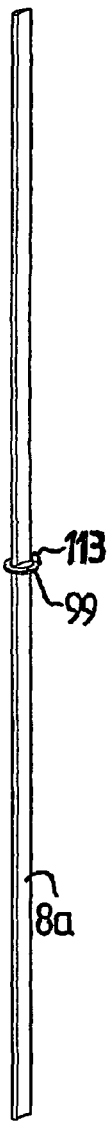
FIG. 32 shows a detail from FIG. 31.
Figure 34:
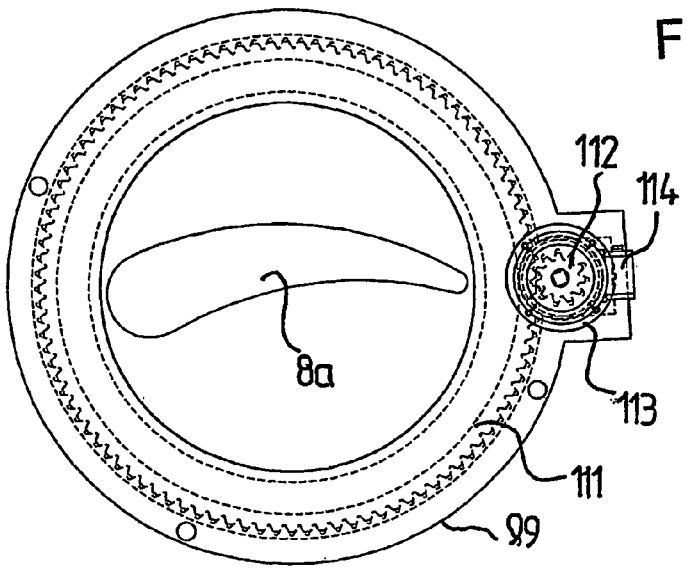
FIG. 34 shows details of an embodiment according to FIG. 31.
Figure 35:
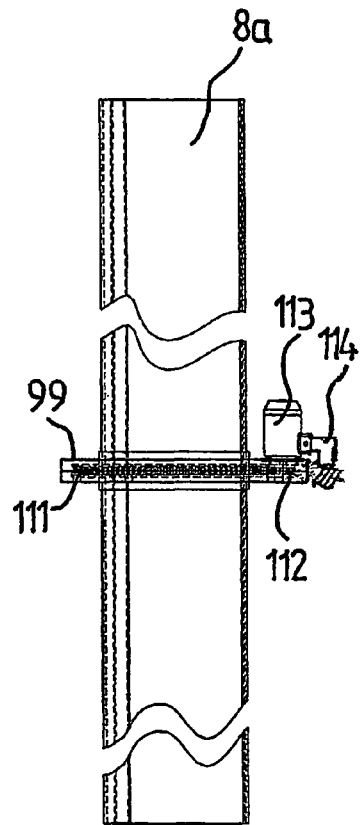
FIG. 35 shows details of an embodiment according to FIG. 31.

FIG. 32 shows a single element 8 with its orientation system 99. How these elements 8 with their orientation systems 99 are arranged on the retaining ring 92 and on the retaining surface 91 is shown in FIG. 31. As can be seen in FIG. 34, the elements 8 can also comprise the cross-sectional surface of a wing.

Figure 33:
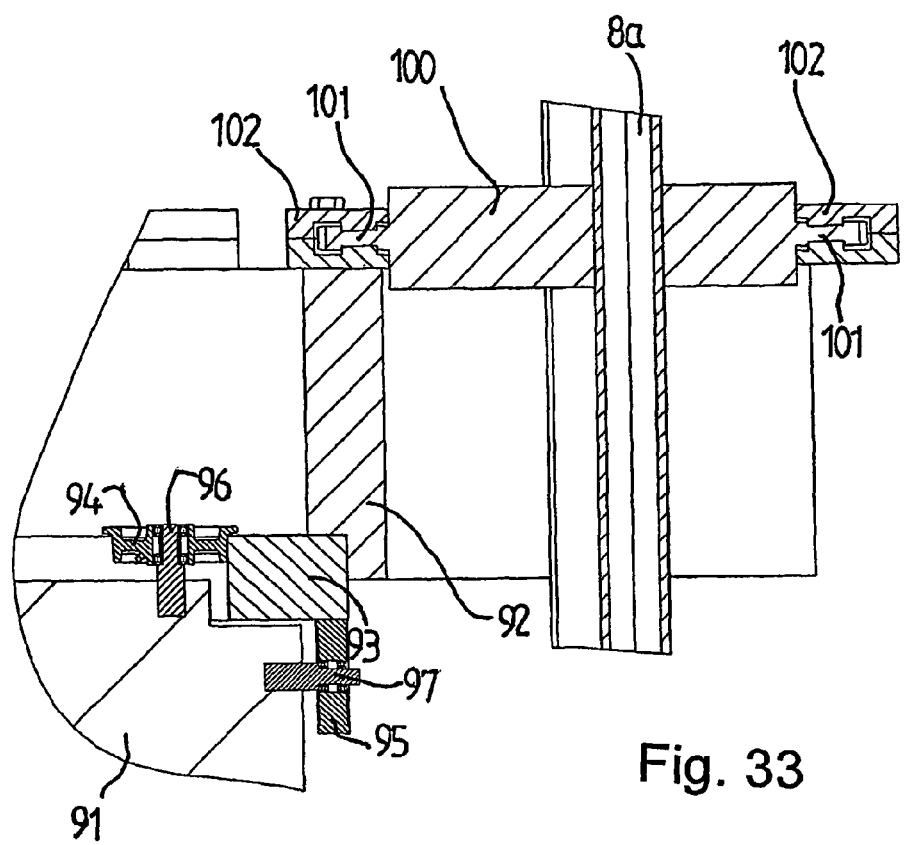
FIG. 33 shows details of an embodiment according to FIG. 31.

FIG. 33 shows an exemplary embodiment of the support system for the elements 8 on the retaining ring 92, in which the support elements 100 carrying the elements 8 comprise bearing journals 101 on the ends, which are rotatably supported in bearings 102. This support system is arranged together with the element 8 in cutouts in the ring 92. The system for supporting the retaining ring 92 on the retaining surface 91 is similar in design to that of the support system according to FIG. 30.

Figure 66:
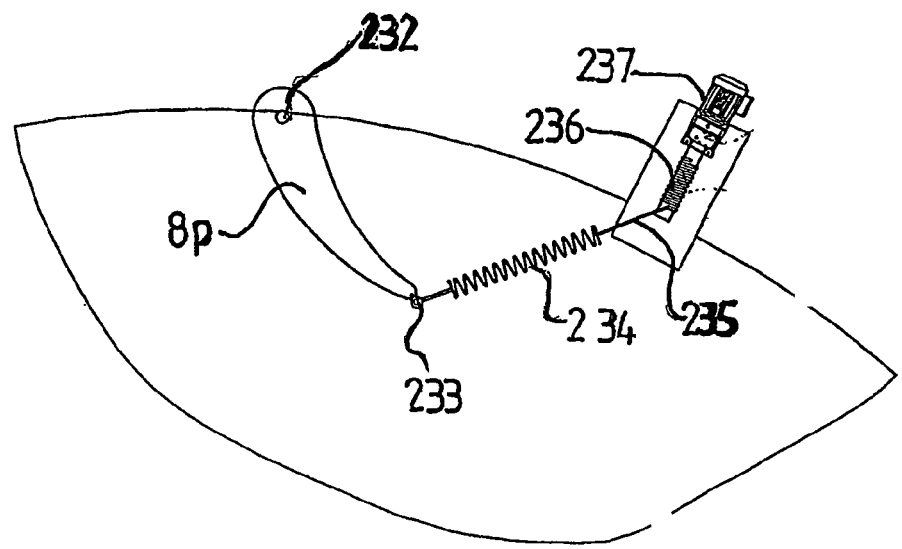
FIG. 66 shows a top view of details of an embodiment.

Another way in which the orientation of the elements 8*p* can be controlled individually is shown in FIG. 66. The wing-shaped elements 8*p* are rotatably supported at a point 232 on the side of the wing shape which appears thicker when seen in cross section. At the point 233 on the other side of the wing shape, the element 8*p* is held in place by a wire cable, which is connected to another wire cable 235 by a spring 234. The orientation of the elements 8*p* is controlled by rolling the cable 235 up on a shaft 236, which is connected to an electric motor 237. By rolling and unrolling the cable 235, the element acquires a more tangential orientation to the ring or a more radial orientation. The spring 234 compensates for fluctuations in the intensity of the flow.

As shown in FIG. 67, the airfoil shape of an element can also be obtained by combining several individual elements 8*r*, which fit into each other and can tilt relative to each other to a limited extent. These individual elements combine to form the overall shape of an airfoil, which tapers to a sharp edge on one side and is rounded on the other side. By adjusting the shape of the airfoil, the elements 8*r* can thus be adapted to the wind direction as a function of the position of the individual element 8*r* on the rotor during its rotation. The advantageous design of the curved airfoil shape can therefore be obtained both on the upstream side relative to the wind direction and on the downstream side. The deflection of the elements 8*r* can be controlled by way of the previously described retaining system at point 233 with the steel cable 235 and the electric motor 237.

FIG. 68 shows another exemplary embodiment, in which the elements 8*r*, as previously described, are rotatably supported at point 232 but are provided on the other cross-sectional side of the wing profile with a retaining system comprising a guide wheel 242. Depending on the orientation to the wind, the guide wheel 242 rolls along an inner guide rail 241 or along an outer guide rail 240. Upon the transition from the upstream side to the downstream side, the guide wheel 242 switches over from the inner guide rail 241 to the outer guide rail 240 and vice versa.

FIG. 11 shows a belt 36 with elements 8 and return pulleys 37. The arrow 38 indicates the wind direction, and the arrow 39 indicates the direction in which the belt and the return pulleys move. The elements are moving with the wider part of the element in the leading position. This movement causes the return pulleys 37 to turn. The movement can be transmitted to a generator either directly by way of a shaft or by way of a gear wheel-pinion system.

According to another embodiment, baffles 40 can be installed in front of the belt 36 to direct the air stream 38 to the area of the belt 36 between the two return pulleys 37. As a result, the air stream acts only here on the apparatus, namely, where the incident-flow surfaces have the optimum orientation. In addition, the baffles 40 also increase the cross-sectional area of the air stream which can be captured.

Figure 17:
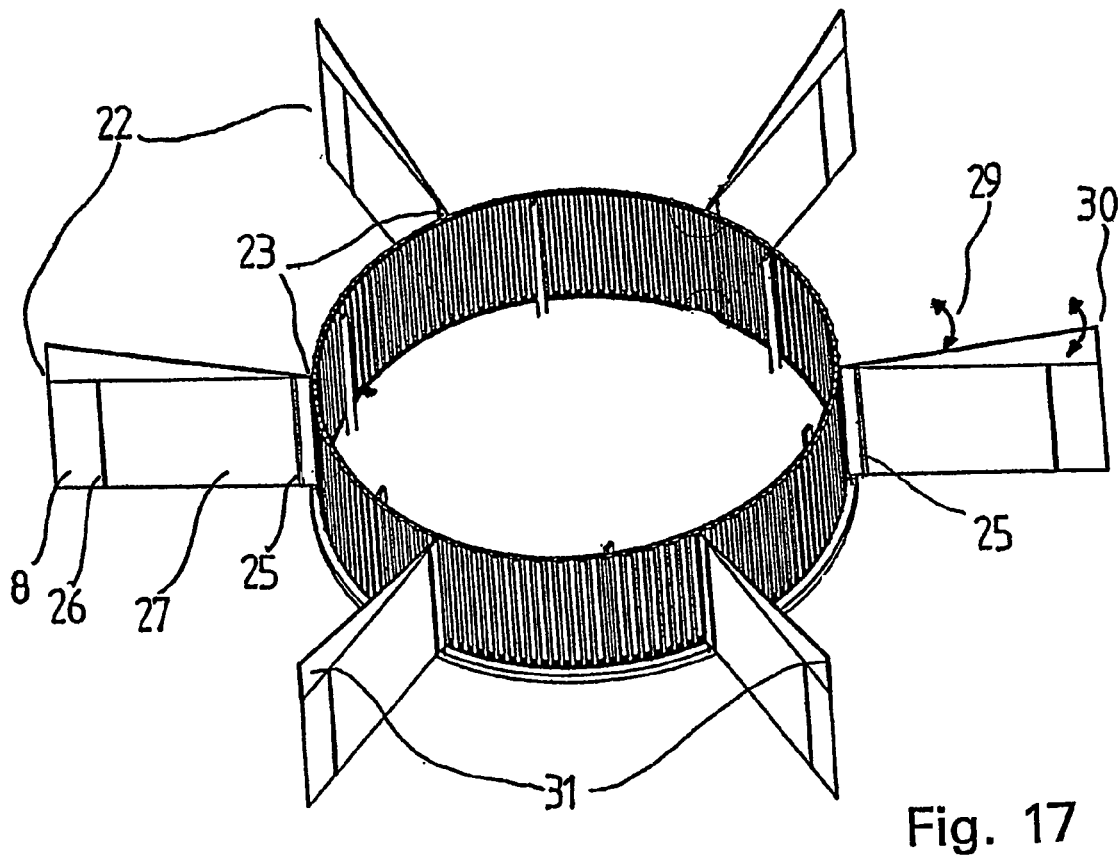
FIG. 17 shows a top, angled view of a some of the parts of the apparatus of FIG. 1.
Figure 22:
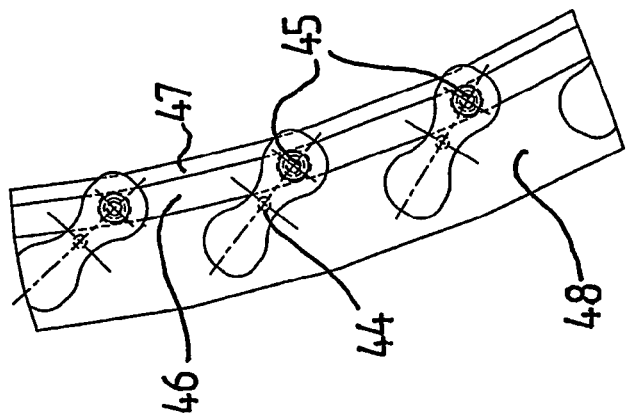
FIG. 22 shows a top view of a detail of FIG. 10 on an enlarged scale.

In another exemplary embodiment, baffles 22, extending radially relative to the circular form of the cage 1, are mounted outside the cage. The walls serve to focus the wind and to increase the cross-sectional area for wind capture. As can be seen in FIG. 17, six of these walls are installed equal distances apart in this exemplary embodiment. The baffles 22 are nearly flush with the side 23 of the cage in order to guarantee optimal feed of the wind.

Figure 10:
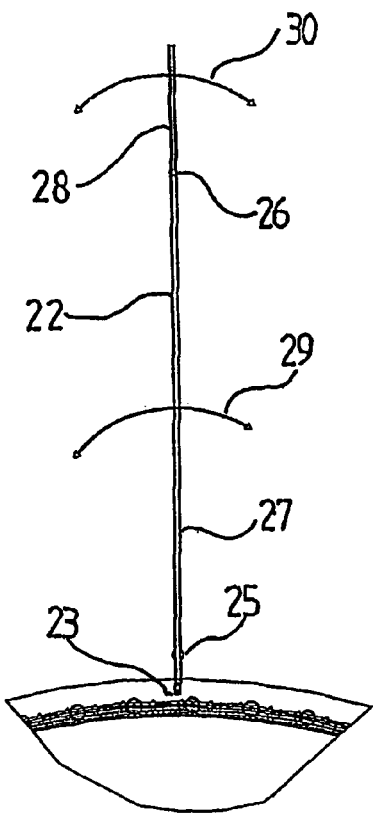
FIG. 10 shows a top view of a detail.

It is advisable for the baffles 22 to be pivotable, so that they can direct the air stream to the elements more effectively. For this purpose, joints 25 and 26 are attached to the baffles and thus divide the baffles into wall elements 27 and 28. As indicated in FIG. 10 by the arrows 29 and 30, the wall elements 27 or 28 can be swung around the joints and thus brought into different positions.

FIGS. 18, 19, 20, and 59 show arrangements of baffles 22 in stationary installations. Free spaces 77 are present between the individual baffles 22, so that the air can strike the rotor 1 directly when it arrives parallel to the baffles 22. In principle, the arrangement will be selected so that, regardless of the direction from which the air stream is coming, it is always guided in the radial direction to the elements 8. With the arrangement of FIG. 18, the air stream on the side 69 on the left relative to the direction 78 of the air stream strikes a different profile than on the right side 70. On the left side 69, the air is conducted radially to the elements. As a result, the braking action on the wider side of the elements 8 on the left side 69 is reduced. On the right side 70, the air is guided more tangentially and thus has the effect of accelerating the rotor 1 in the direction shown by the arrow 79. In addition, the baffles 200 shown in FIG. 59 can be oriented tangentially to the rotor 1. It is advantageous for the flow to be conducted to the elements on the side where it promotes rotation and deflected away from them on the other side.

Figure 73:
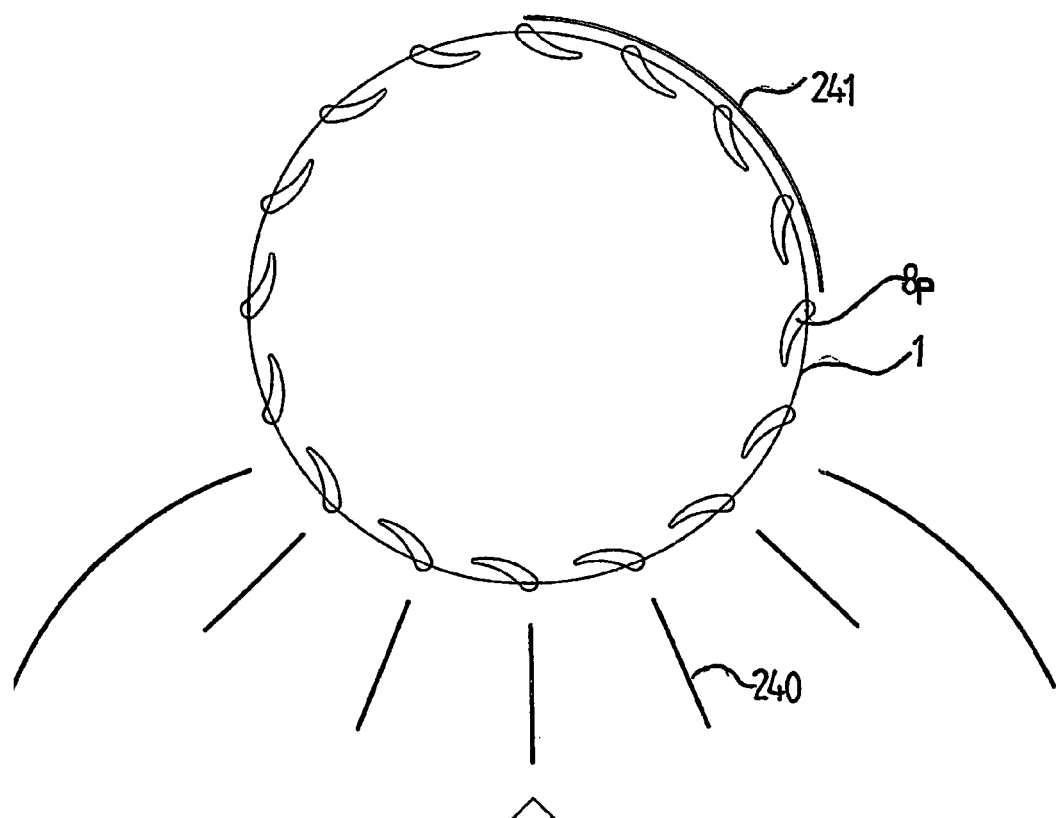
FIG. 73 shows a top view of another apparatus.

FIG. 73 shows another exemplary embodiment, in which the wind is focused onto the rotor 1 by baffles 240 on the side facing the wind. On the right side, i.e., the side facing away from the wind, a shield 241 is provided. This serves the purpose of preventing the wind from striking the elements 8p here. In this location, they would exert a force on the rotor 1 acting in opposition to its desired rotation. A shield 241 of this type could also be arranged on the inside of the rotor 1.

Figure 60:
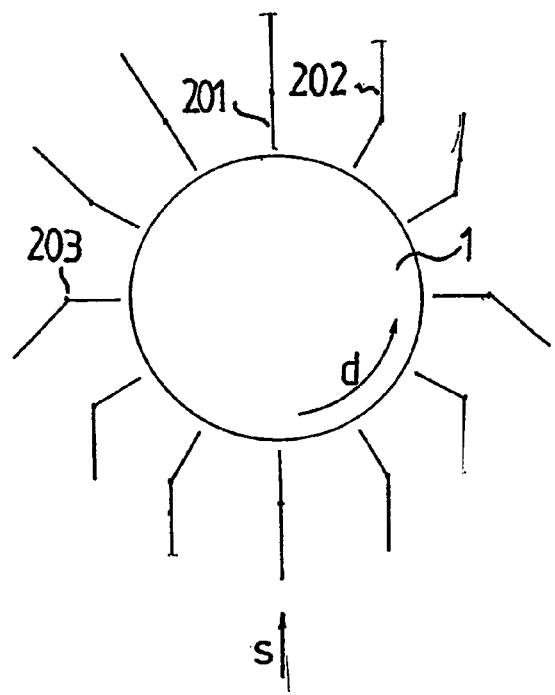
FIG. 60 shows a top view of an additional apparatus.
Figure 61:
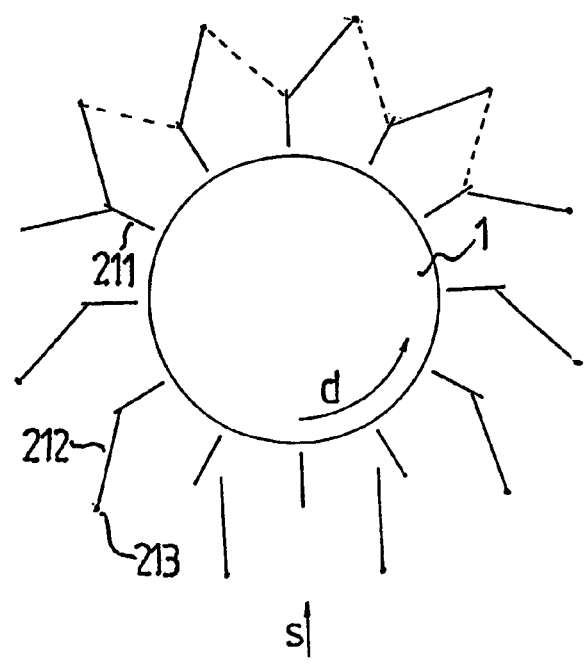
FIG. 61 shows a top view of an additional apparatus.

FIG. 60 shows baffles consisting of a stationary part 201 and a movable part 202. The movable part 202, which is mounted on the edge of the stationary part 201 and which faces away from the rotor 1, can be oriented around an axis of rotation. The orientation of the movable part 202 of the baffle can be adjusted in accordance with the flow direction "s"; this can also be done by means of motors and could also be implemented automatically.

In another exemplary embodiment as shown in FIG. 60, the outer movable baffles 212 are movably supported along their outer edges. They can move between two stop positions, which are defined by the stationary inner baffles 211; that is, they can come to rest against the outer edge of either of two adjacent baffles 211. When the baffles are guided in this way, no control system is required. The outer baffles 212 orient themselves automatically with respect to the wind direction "s".

In principle, the orientation of the previously mentioned movable baffles can also be controllable. The baffles can be provided with motors such as electric motors for this purpose.

The baffles in the exemplary embodiments described above should be installed up to a distance from the center point of the rotor 1 equal to approximately twice the radius of a rotor 1. The baffles do not necessarily have to terminate on an imaginary circle. Different numbers of baffles could also be imagined. In residential areas, for example, rectangular arrangements of the end points of the baffles can be of interest in terms of both appearance and energy efficiency.

It is advantageous for stationary baffles to be arranged close to the rotor, so that they can serve as bearings for the rotor and as a support element for structural parts or for the control systems. The baffles can also be used, for example, to provide the retainers for the rotor described above on the basis of FIGS. 28 and 29. There will then no longer be any need for an inner retaining surface 91 and the corresponding support elements for this retaining surface.

Figure 21:
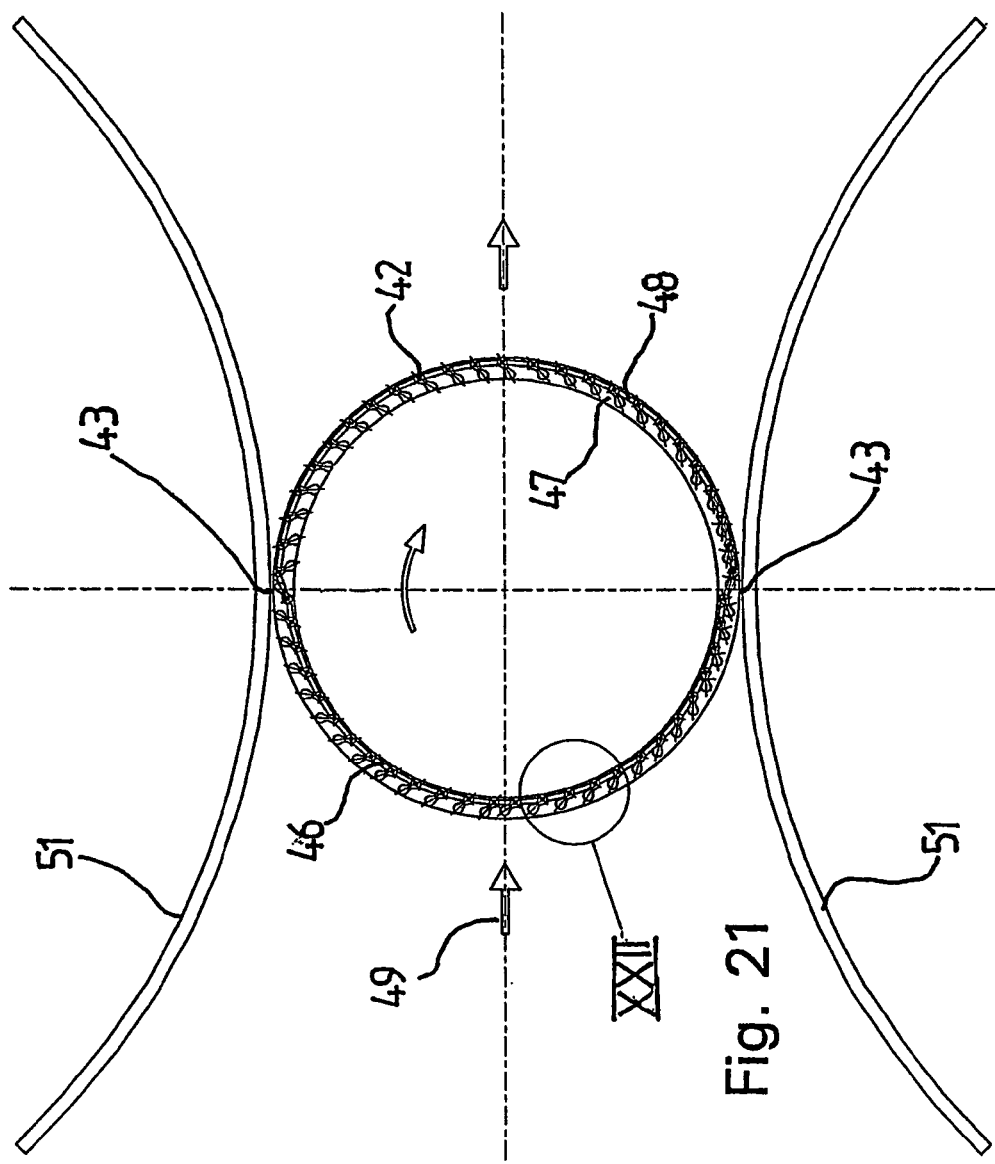
FIG. 21 shows a top view of another apparatus for using wind energy in the form of a schematic diagram.

FIG. 21 shows a cage with pivotable elements 42. The orientations of the elements 42 are reversed at the two points on the outer sides 43 of the cage. Each element is rotatably supported and pivoted around an axis 44. They are connected on one side 45 to a guide belt 46. On the side facing the wind, this belt passes along the inner half 47 of the support strip, and on the side facing away from the wind, it passes along the outer half 48. The orientations of the elements 8 are reversed by the switching of the guide belt between the positions 47 and 48, which occurs at the two points on the outer sides 43. As a result of this reversal, the elements 42 are oriented in such a way that they support the movement of the rotor 1 both on the side facing the wind and on the side facing away from the wind. The wind direction is represented by the arrows 49, and the rotational direction of the cage 1 is represented by the arrow 50.

In another embodiment, the air stream is guided to the cage by two baffles 51. The two baffles 51 are convex in shape and installed symmetrically with respect to each other. The cage 1 is set up between them. The baffles are mounted at the points 43 on the sides of the cage. The apparatus is preferably designed so that the direction of the air stream is parallel to the axis of symmetry of the two walls 51. In another embodiment, the entire apparatus is supported with freedom to rotate and can thus be adapted to the direction of the wind.

Figure 56:
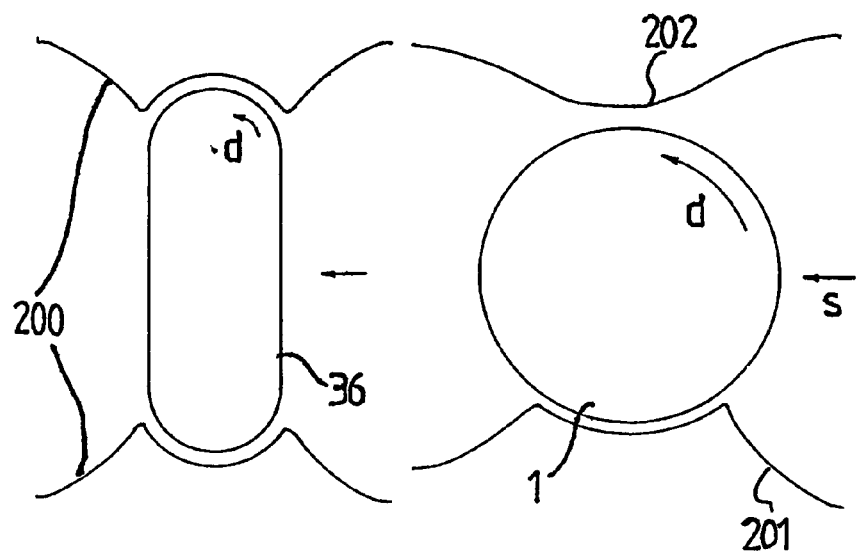
FIG. 56 shows an overall top view of an embodiment of the apparatus.
Figure 57:
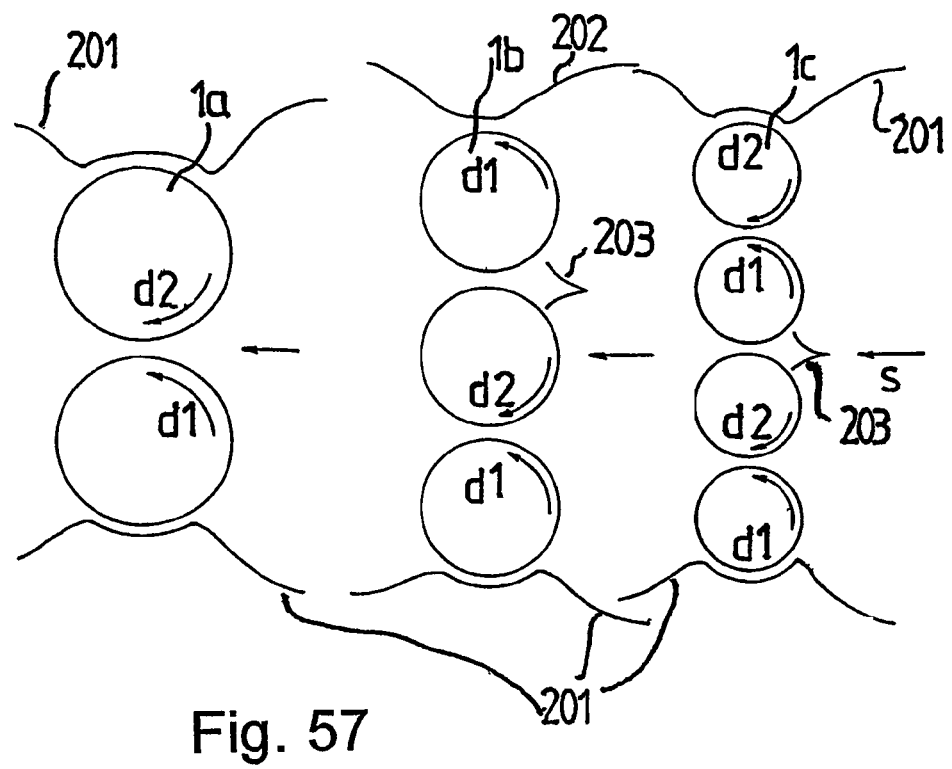
FIG. 57 shows an overall top view of an embodiment of the apparatus.
Figure 58:
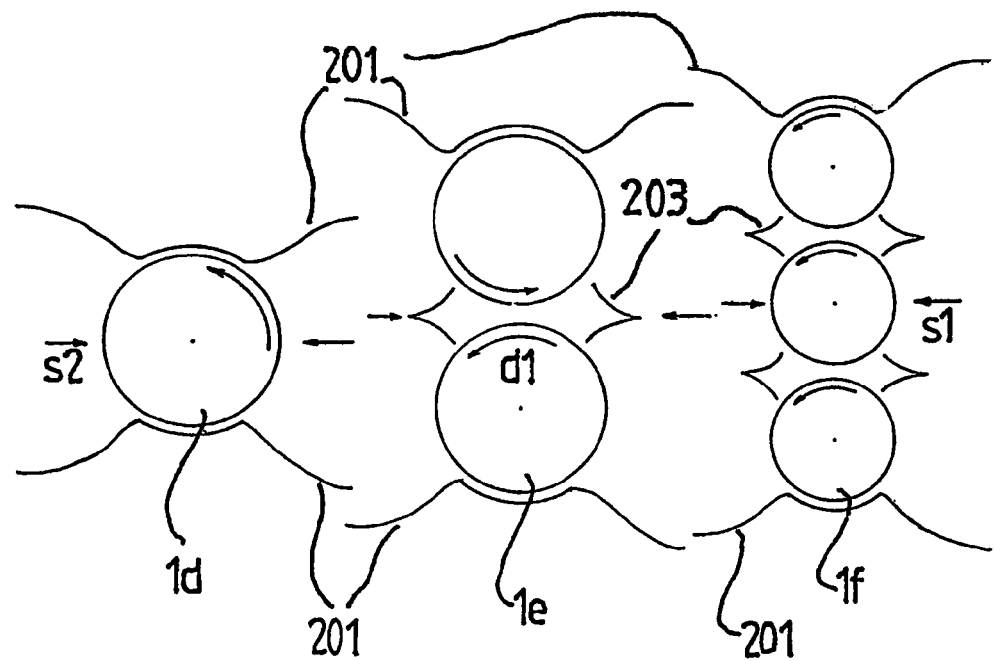
FIG. 58 shows an overall top view of an embodiment of the apparatus.
Figure 59:
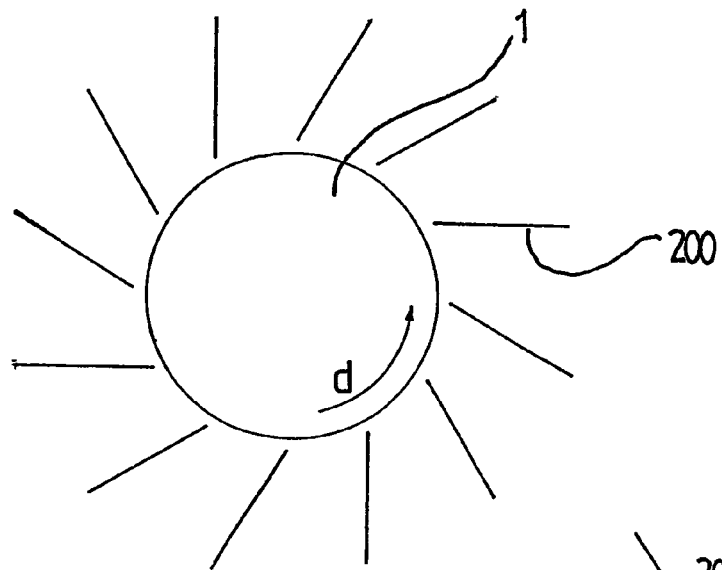
FIG. 59 shows a top view of an additional apparatus.

FIGS. 56-58 show several different ways in which several rotors can be arranged. The rotors can be set up one behind the other in a row or parallel to each other. Two cases are to be distinguished here: the case in which the flow comes from only a single direction, and the case in which the flow can come from two opposite directions.

In FIG. 56, a rotating cage 1 and a rotor with elements guided on an endless traveling belt 36 are arranged one behind the other in the flow direction "s". To guide the flow, a baffle 201, which directs the flow onto the cage in such a way that the flow does not act on the elements in opposition to the direction in which they travel, is set up on the left side relative to the flow direction "s". For this purpose, the baffle 201 extends up very close to the rotor on the left side and at least partially encloses it. On the opposite side, however, the baffle 202 extends in such a way that the flow impinges laterally on the rotor 1 and therefore drives the elements in their direction of rotation. To recover even more of the remaining flow energy, the flow is conducted by additional baffles 200 onto the elements arranged on the endless traveling belt 36.

Figure 69:
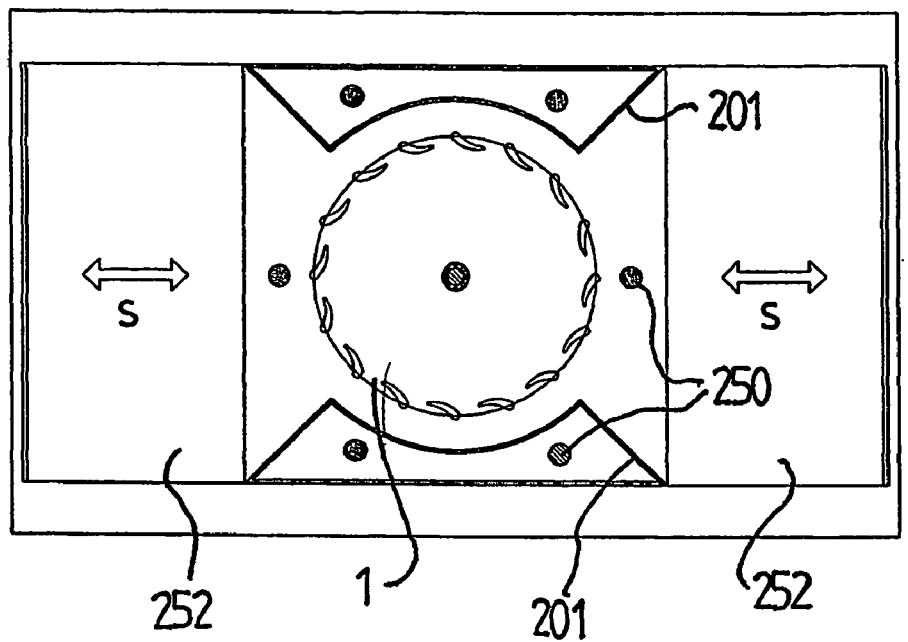
FIG. 69 shows a top view of another apparatus.
Figure 70:
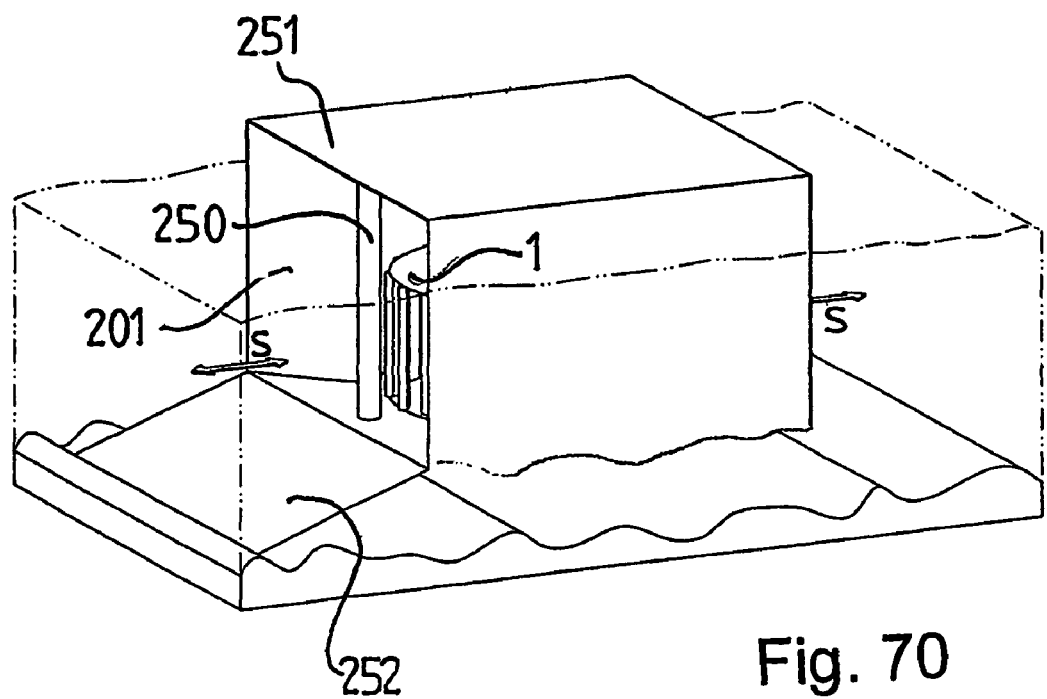
FIG. 70 shows a top, angled view of the apparatus according to FIG. 69.

An exemplary embodiment of a rotor 1 of this type for the use of water energy can be seen in isolation in FIGS. 69 and 70. The rotor is surrounded by the sidewalls 201 and by a roof covering 251, supported on posts 250. In addition, the flow "s" is also guided to the rotor 1 by ramps 252.

In an additional example according to FIG. 57, three groups of parallel cages 1a, 1b, and 1c are arranged one behind the other in the flow direction. The cages rotate in two opposite directions d1 and d2. The first group 1c subjected to the flow has four cages. On the outer sides of group 1c, baffles 201 are set up, which act in the same way as those discussed in conjunction with FIG. 56. In the area between an outer and an inner cage, the flow direction contributes to the rotation in both direction d1 and direction d2. In the area between the two inner cages, the flow would brake the rotational movement. For this reason, the flow is diverted laterally onto the cages by a baffle 203 and thus promotes their rotational movement. In the case of the following cage group 1b, in analogy to the previous examples, a baffle 203 is arranged between the cages on the right side relative to the flow direction; a baffle 202 is arranged on the right side; and a baffle 201 is arranged on the left side. In correspondence with the rotational direction of the two cages constituting the cage group 1a, baffles 201 are arranged at the outer sides of the cages in such a way that the flow is diverted away from the elements traveling in the direction opposite to that of the flow.

In another exemplary embodiment, shown in FIG. 58, the baffles are arranged in such a way that the flow energy can be captured in two flow directions "s1" and "s2". The baffles are arranged here so that the cages, arranged in groups 1d, 1e, and 1f, one behind the other, always move in the same rotational direction "d1". So that the flow from both flow directions always arrives at the cages in such a way that that it does not brake their rotation, baffles 201 are brought up from both sides to a point very close to the cages. Baffles 203 must be arranged correspondingly on both sides of the cage groups. Arrangements of elements of this type are of interest for tidal power plants, in which the flow arrives in one direction at ebb tide and in the opposite direction at flood tide.

Figure 23:
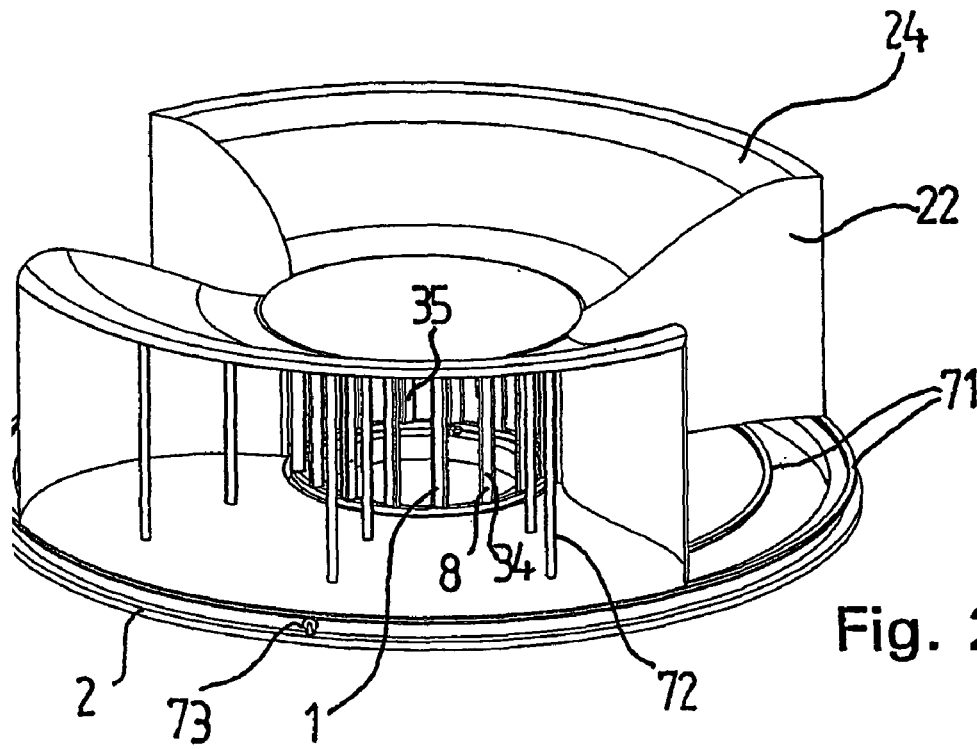
FIG. 23 shows an overall view of an embodiment of the apparatus according to FIG. 1.
Figure 40:
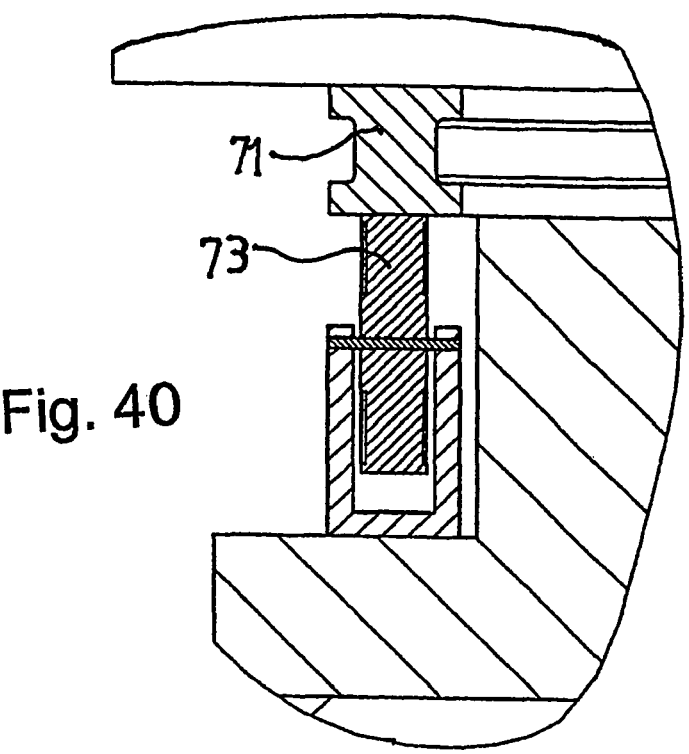
FIG. 40 shows a detail on an enlarged scale.

FIG. 23 shows an exemplary embodiment in which the device for focusing the air with baffles 22 and a roof 24 is arranged to rotate around the rotor 1. The roof is supported by support struts 72. As illustrated in detail in FIG. 40, the entire device is mounted on circular rails 71, which are guided on rollers 73 attached to the base 2. The focusing device is moved into the wind in such a way that the opening is perpendicular to the direction in which the wind is arriving. The opening which is now in the rear is responsible for creating an additional suction effect.

Figure 24:
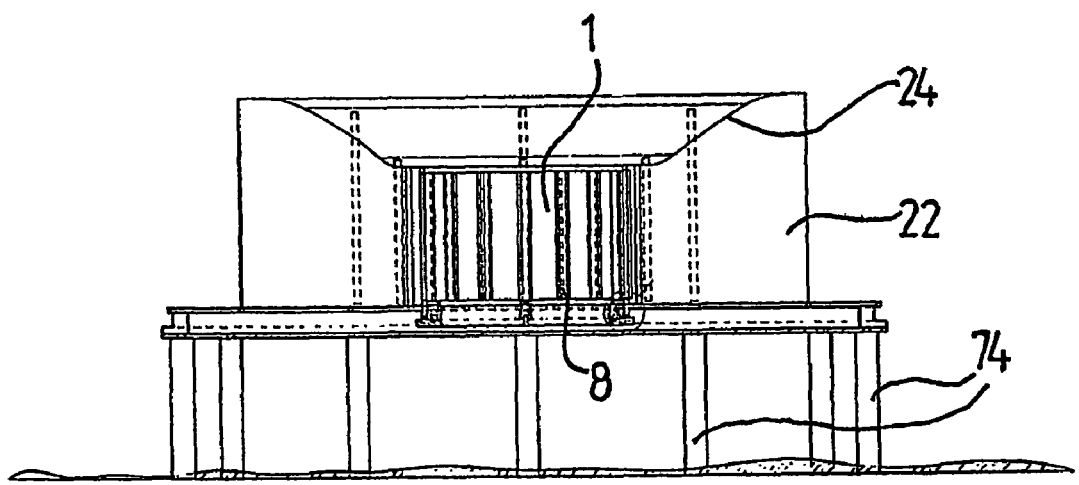
FIG. 24 shows an overall view of another embodiment of the apparatus according to FIG. 1.

FIG. 24 shows how the apparatus can be supported on support elements 74 in the form of columns.

Figure 37:
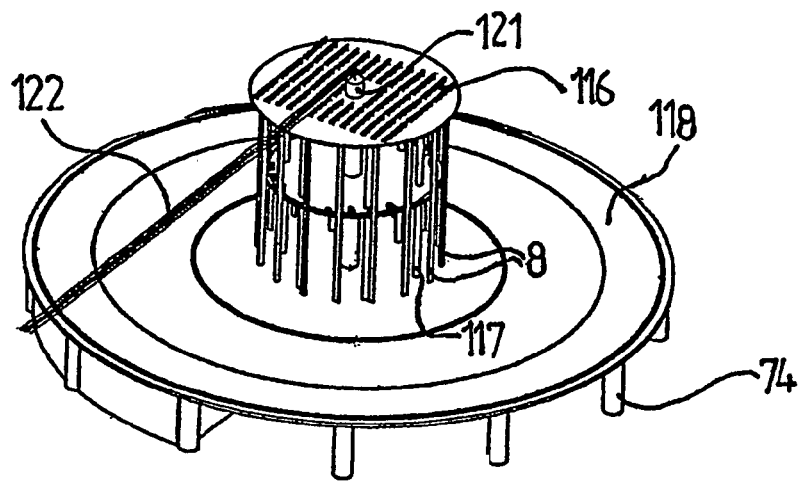
FIG. 37 shows parts of an embodiment of the apparatus according to FIG. 1.
Figure 38:
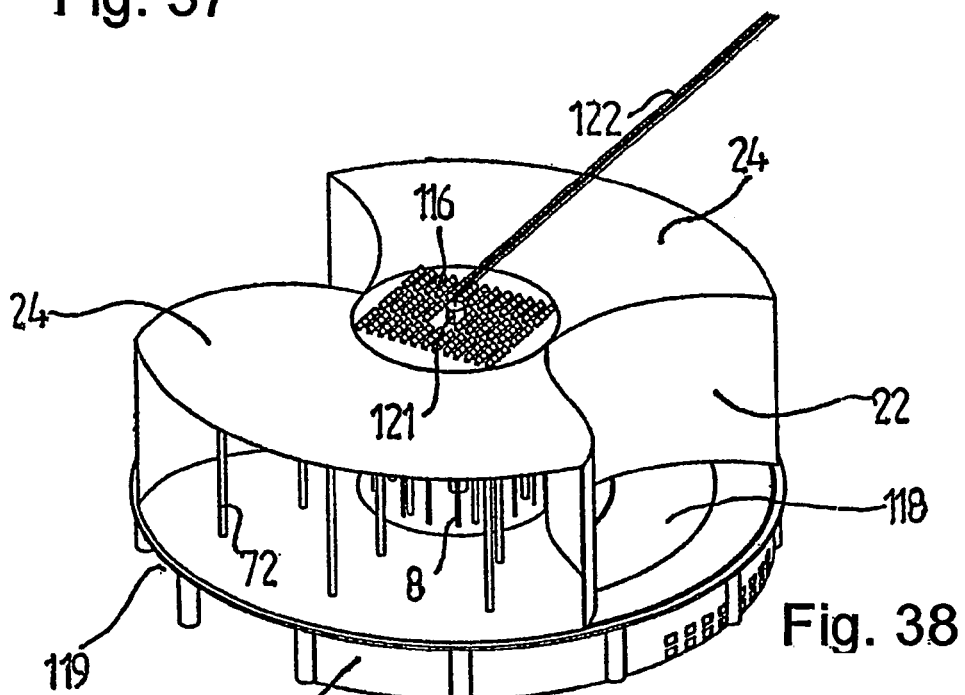
FIG. 38 shows a top, angled, overall view of an embodiment of the apparatus according to FIG. 1.
Figure 39:
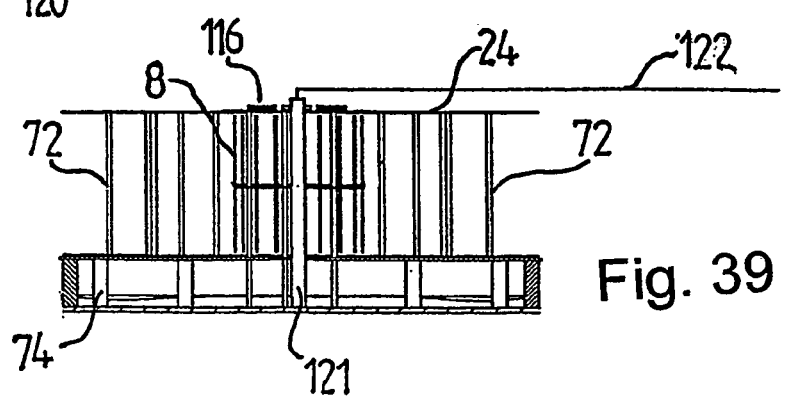
FIG. 39 shows an overall side view of an embodiment of the apparatus according to FIG. 1.

FIGS. 37-39 show another embodiment of an apparatus for focusing the air onto the cage 1 with elements 8 attached at their midpoints. In correspondence with FIGS. 28-30 and FIGS. 31-35, the elements 8 are attached at their midpoints to a retaining ring 92 and thus supported on a retaining surface 91. The retaining surface 91 is carried by outer support columns 117 and by an inner support column 121. These columns 117 and 121 stand on a circular plane 118, which is supported on the ground by supports in the form of columns 74. The retaining surface and the elements are covered by a roof, carried by columns 117 and 121, and the roof itself carries photovoltaic systems 116. As shown in FIG. 38, the apparatus is provided with baffles 22 and a roof 24, which can be rotated in the direction of the wind on the circular plane 118. Underneath the circular plane 118, parking spaces 119 or offices 120 can be provided. The electric current thus generated can be transmitted directly from the apparatus via an overhead power line 122, where the overhead power lines 122 preferably leave from the central column 121. The apparatus therefore also fulfills the function of a power pylon.

Figure 71:
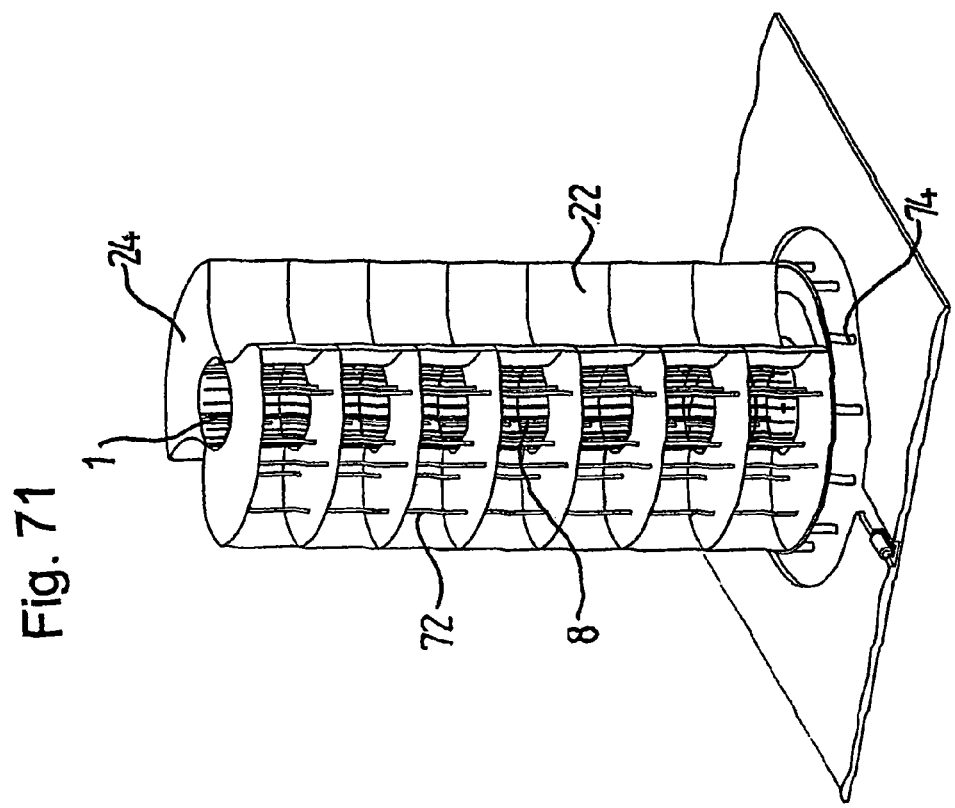
FIG. 71 shows a top, angled view of an additional apparatus.

In another embodiment of the invention, shown in FIG. 71, several of the previously described rotors are installed in a tower, one on top of the other. Each rotor is approximately 40 m tall. Seven rotors are arranged in the stack. The wind direction can be measured at the level of each rotor, and the individual rotors can be oriented to the wind depending on which of the designs described above is being used. For example, the baffles can be turned to the wind and/or the individual rotor blades in the rotors in question can be oriented as needed.

Figure 72:
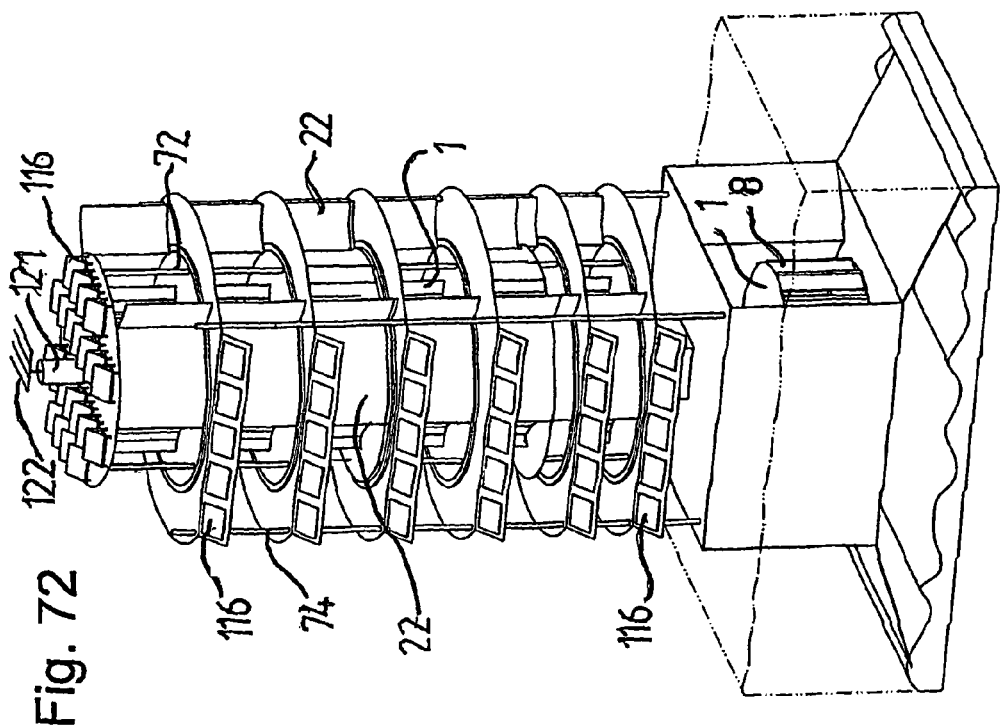
FIG. 72 shows a top, angled view of an additional apparatus.

A tower of this type, furthermore, can also be built on top of a hydroelectric power plant according to FIGS. 69 and 70. FIG. 72 shows a plant of this type, in which the flow energy of water in a river or in an area of the ocean with strong currents, for example, can be recovered in the lower area, and, in the area above the water, wind energy can be recovered in the same way as described in conjunction with the exemplary embodiments shown in FIGS. 37-39 and FIG. 72. In addition, photovoltaic systems 116 can also be mounted on an installation of this type.

It is advantageous that a multi-functional apparatus of this type is subject to fewer weather-related fluctuations, because various energy sources can be exploited as a result of the possibility of extracting energy from wind, water, and the sun.

At least some of the interior space of large systems, furthermore, can be used to store energy, e.g., in batteries or as hydrogen. The stored energy can be used to fill in the energy gaps, i.e., the gaps which occur during time periods with little or no wind.

The invention claimed is:

1. An apparatus for using flow energy, especially wind energy, with elongated elements which travel around a closed path and comprise incident-flow surfaces which face the flow, wherein the elongated elements are arranged parallel to each other and a certain distance apart to form a rotating cage or an endless traveling belt, which travels along a guide and on which the elongated elements form rungs, the axis of rotation of the elongated elements or the deflection axes of the elongated elements being transverse to a direction of the flow, wherein, during travel of the rotating cage or the endless traveling belt, the elongated elements can be pivoted independently of each other such that incident-flow surfaces are in a proper orientation to the flow and wherein, during travel of the rotating cage or the endless traveling belt, the orientation of each elongated element can be controlled individually, the apparatus further comprising a control unit for the automatic orientation of the elongated elements to adapt them to the flow direction and/or to flow intensity and/or to rotational speed of the rotating cage.

2. An apparatus according to claim 1, wherein, if the elongated elements are arranged parallel to each other and a certain distance apart to form a rotating cage, the elongated elements are held in place on the rotating cage at a point near the midpoint of their length.

3. An apparatus according to claim 1, wherein, if the elongated elements are arranged parallel to each other and a certain distance apart to form a rotating cage, the rotating cage is provided with a gear rim and is connected to at least one generator by at least one pinion, which meshes with this gear rim and is mounted preferably on the inside of the rotating cage.

4. An apparatus according to claim 1, wherein, if the elongated elements are arranged parallel to each other and a certain distance apart to form a rotating cage, the rotating cage's geometric axis passes a support system for the rotating cage, where the rotating cage is connected to its support system by struts.

5. An apparatus according to claim 1, wherein, if the elongated elements are arranged parallel to each other and a certain distance apart to form a rotating cage, permanent magnets or electromagnets are arranged on the rotating cage or next to the rotating cage, and where induction coils are arranged correspondingly on the other side, near the rotating cage or on the rotating cage.

6. An apparatus according to claim 1, wherein, if the elongated elements are arranged parallel to each other and a certain distance apart to form a rotating cage, the rotating cage is supported on a rail system by both vertically mounted wheels and horizontally mounted wheels, where both a vertical guide and a horizontal guide are provided at the bottom of the rotating cage, whereas only a horizontal guide is provided at the top, or where both a vertical guide and a horizontal guide are provided approximately at mid-height of the rotating cage on its inner or outer side.

7. An apparatus according to claim 6, wherein at least one wheel is connected to a generator.

8. An apparatus according to claim 1, wherein, if the elongated elements are arranged parallel to each other and a certain distance apart to form an endless traveling belt, at least one return pulley of the previously mentioned endless traveling belt is provided with a gear rim and is connected to at least one generator by at least one pinion, which meshes with the gear rim and is mounted on the inside of the return pulley.

9. An apparatus according to claim 8, wherein, if the elongated elements are arranged parallel to each other and a certain distance apart to form an endless traveling belt, the flow is focused by baffles onto the endless traveling belt, in an area between return pulleys.

10. An apparatus according to claim 1, wherein each element (8, 42) has two incident-flow surfaces, one of the incident-flow surfaces, as one of the elongated elements travels, faces the flow when the elongated element is on the upstream side of the rotating cage or the endless traveling belt, whereas another of the incident-flow surfaces faces the flow when the elongated element is on the downstream side.

11. An apparatus according to claim 10, wherein the overall cross-sectional form of the elongated elements is triangular and preferably symmetric, in which the two incident-flow surfaces form two sides of the triangle.

12. An apparatus according to claim 10, wherein, while the rotating cage or the endless traveling belt is traveling, the elongated elements can be pivoted, preferably by the action of the flow itself, so that the two incident-flow surfaces are oriented to the flow.

13. An apparatus according to claim 10, wherein the elongated elements are supported so that they can pivot around an axis parallel to the incident-flow surface and are held in position in the pivoting direction by springs.

14. An apparatus according to claim 1, wherein, if the elongated elements are arranged parallel to each other and a certain distance apart to form a rotating cage, the apparatus is provided with baffles, which are mounted outside the rotating cage and extend toward the center of the rotating cage, thus being oriented essentially in the radial direction, where preferably the baffles consist of several members having an orientation that can be changed by pivoting the several members around joints which serve to connect the several members to each other.

15. An apparatus according to claim 14, wherein the rotating cage and the baffles are covered by a roof in the form of a flat frustum of a cone having a lower, smaller circular surface that is essentially equal to a cross section of the rotating cage, whereas an upper, larger cross-sectional surface has the same radial dimension as the baffles.

16. An apparatus according to claim 15, wherein the apparatus comprises overhead power lines, and the overhead power lines proceed from the roof.

17. An apparatus according to claim 15, wherein several rotating cages installed in a tower, are arranged one on top of the other, where the lower rotating cages are designed to extract water power, whereas the upper rotating cages are designed to extract wind energy.

18. An apparatus according to claim 17, wherein the roof, the baffles, and/or the tower are provided with systems for recovering solar energy.

* * * * *